(12) United States Patent
Krause

(10) Patent No.: US 10,479,173 B2
(45) Date of Patent: Nov. 19, 2019

(54) WINDOW ASSEMBLY, AND VEHICLE DOOR AND VEHICLE FEATURING THE WINDOW ASSEMBLY

(71) Applicant: COOPER STANDARD GMBH, Lindau/Bodensee (DE)

(72) Inventor: Fritz Krause, Hergatz (DE)

(73) Assignee: COOPER STANDARD GMBH, Lindau/Bodensee (DE)

( * ) Notice: Subject to any disclaimer, the term of this patent is extended or adjusted under 35 U.S.C. 154(b) by 0 days.

(21) Appl. No.: 15/773,077

(22) PCT Filed: Jan. 18, 2016

(86) PCT No.: PCT/EP2016/050924
§ 371 (c)(1),
(2) Date: May 2, 2018

(87) PCT Pub. No.: WO2017/076513
PCT Pub. Date: May 11, 2017

(65) Prior Publication Data
US 2018/0319257 A1 Nov. 8, 2018

(30) Foreign Application Priority Data
Nov. 2, 2015 (EP) ..................... 15192665

(51) Int. Cl.
*E05D 15/16* (2006.01)
*B60J 5/04* (2006.01)
(Continued)

(52) U.S. Cl.
CPC ............. *B60J 5/0402* (2013.01); *B60J 10/76* (2016.02); *B60J 10/77* (2016.02); *B60J 10/79* (2016.02)

(58) Field of Classification Search
CPC . B60J 5/0402; B60J 10/77; B60J 10/76; B60J 10/79
(Continued)

(56) References Cited

U.S. PATENT DOCUMENTS 4,240,227 A * 12/1980 Hasler ...................... B60J 10/79
49/348
4,483,100 A * 11/1984 Blankenburg ........ E05F 11/426
49/352
(Continued)

FOREIGN PATENT DOCUMENTS

DE 10 2014 005 721 B3 8/2015
EP 0 161 685 B1 1/1991
(Continued)

OTHER PUBLICATIONS

PCT/EP2016/050924 International Search Report and Written Opinion, Prepared by the European Patent Office, dated Jul. 2, 2016.

*Primary Examiner* — Jerry E Redman
(74) *Attorney, Agent, or Firm* — Fay Sharpe LLP

(57) ABSTRACT

A window assembly (190) for a window opening of a motor vehicle, which has a front-rear direction and a vertical direction, comprises a door frame member (21), a movable window pane (140), and a window guiding profile (100). The door frame member (21) includes an outer surface (25). The movable window pane (140) includes a guiding section, and a window section (141). The window section comprises an outer window surface (142) and an inner window surface (143). The window guiding profile (100) is fastened to the door frame member (21), and includes a sealing portion (115, 117, 118). The sealing portion seals and supports the window pane (140). The window guiding profile (100) includes a first guiding portion (110) configured to guide the window pane (140) only at the inner window surface (143). The window guiding profile (100) further includes a second
(Continued)

guiding portion being configured to guide the window pane (140) at the window outer surface (142) and at the window inner surface (143).

13 Claims, 13 Drawing Sheets

(51) Int. Cl.
*B60J 10/76* (2016.01)
*B60J 10/77* (2016.01)
*B60J 10/79* (2016.01)

(58) Field of Classification Search
USPC .................................. 49/502, 349, 440, 441
See application file for complete search history.

(56) References Cited

U.S. PATENT DOCUMENTS

| | | | | |
|---|---|---|---|---|
| 4,490,942 A * | 1/1985 | Arnheim | ................ | B60J 10/24 49/374 |
| 4,550,529 A * | 11/1985 | Drouillard | ................ | B60J 1/17 49/348 |
| 4,608,779 A * | 9/1986 | Maeda | ................ | B60J 10/248 428/122 |
| 4,771,575 A * | 9/1988 | Tesler | ................ | B60J 1/17 49/211 |
| 4,783,930 A * | 11/1988 | Tesler | ................ | B60J 1/17 49/227 |
| 4,874,201 A * | 10/1989 | Scaglietti | ................ | B60J 10/24 296/201 |
| 4,875,307 A * | 10/1989 | Barbero | ................ | B60J 10/24 49/374 |
| 4,905,412 A * | 3/1990 | Srock | ................ | B60J 1/17 49/352 |
| 4,932,161 A * | 6/1990 | Keys | ................ | B60J 10/24 49/374 |
| 4,970,827 A * | 11/1990 | Djordjevic | ............ | E05F 11/488 49/349 |
| 4,988,142 A * | 1/1991 | Chandler | ............... | B60J 5/0402 296/146.2 |
| 5,054,242 A * | 10/1991 | Keys | ................ | B60J 10/24 49/374 |
| 5,086,589 A * | 2/1992 | dibenedetto | ........... | B60J 5/0402 296/146.3 |
| 5,095,655 A * | 3/1992 | Warren | ................ | B60J 10/24 49/374 |
| 5,154,028 A * | 10/1992 | Hill | ................ | B60J 10/248 296/201 |
| 5,159,781 A * | 11/1992 | Glossop, Jr. | ................ | B60J 1/17 49/375 |
| 5,495,693 A * | 3/1996 | Tesler | ................ | B60J 1/17 296/146.3 |
| 5,613,325 A * | 3/1997 | Mariel | ............. | B32B 17/10036 49/374 |
| 5,732,509 A * | 3/1998 | Buehler | ................ | B60J 10/79 49/440 |
| 6,141,910 A * | 11/2000 | Kobrehel | ............... | B60J 5/0402 49/348 |
| 6,880,293 B2 * | 4/2005 | Ishikawa | .................... | B60J 1/17 49/414 |
| 8,572,898 B2 * | 11/2013 | Grudzinski | ............ | B60J 5/0402 49/441 |
| 8,650,802 B2 * | 2/2014 | Grudzinski | ............ | B60J 5/0402 49/441 |
| 8,667,739 B2 * | 3/2014 | Brookman | ................ | E06B 7/23 49/495.1 |
| 8,701,349 B2 | 4/2014 | Krause | | |
| 8,898,958 B2 * | 12/2014 | Filipczak | ................. | B60J 10/78 296/146.15 |
| 9,038,319 B2 * | 5/2015 | Kuwabara | .............. | B60J 10/048 49/498.1 |
| 9,067,353 B2 * | 6/2015 | Coldre | ................ | B29C 45/1676 |
| 9,597,949 B2 * | 3/2017 | Nojiri | ....................... | B60J 10/76 |
| 9,925,850 B2 * | 3/2018 | Yoshida | ..................... | B60J 1/004 |
| 10,167,659 B2 * | 1/2019 | Sagisaka | ..................... | B60J 1/17 |
| 2001/0034976 A1 * | 11/2001 | Maass | ....................... | B60J 10/24 49/441 |
| 2005/0229496 A1 * | 10/2005 | Tashima | ................... | B60J 10/78 49/441 |
| 2006/0021282 A1 * | 2/2006 | Tamaoki | ................... | B60J 10/74 49/441 |
| 2008/0224501 A1 * | 9/2008 | Zimmer | ....................... | B60J 1/08 296/201 |
| 2009/0001755 A1 * | 1/2009 | Fuetterer | ................ | B60J 5/0409 296/146.16 |
| 2009/0309391 A1 * | 12/2009 | Krause | ..................... | B60J 10/79 296/201 |
| 2010/0107501 A1 * | 5/2010 | Iimori | ................... | E05F 11/423 49/349 |
| 2012/0025564 A1 | 2/2012 | Ellis et al. | | |
| 2013/0160374 A1 * | 6/2013 | Kuwabara | .............. | E05D 15/165 49/440 |
| 2013/0305612 A1 | 11/2013 | Murree | | |
| 2017/0129318 A1 * | 5/2017 | Uemura | .................... | B60J 10/76 |
| 2018/0319257 A1 * | 11/2018 | Krause | ................... | B60J 5/0402 |
| 2018/0319260 A1 * | 11/2018 | Krause | ....................... | B60J 1/17 |
| 2018/0319261 A1 * | 11/2018 | Krause | .................... | B60J 10/27 |

FOREIGN PATENT DOCUMENTS

| | | |
|---|---|---|
| EP | 1 630 024 A1 | 3/2006 |
| EP | 1 794 402 B1 | 6/2010 |

* cited by examiner though-
WINDOW ASSEMBLY, AND VEHICLE DOOR AND VEHICLE FEATURING THE WINDOW ASSEMBLY This application is the national entry filing of PCT/EP2016/050924 (filed 18 Jan. 2016) as a submission under 35 U.S.C. 371, hereby expressly incorporated herein by reference, and also claims the priority benefit of EP Application Serial No. 15192665.6, filed 2 Nov. 2016, which is also hereby expressly incorporated herein by reference The invention generally relates to a window assembly for a motor vehicle. Furthermore, the invention relates to a vehicle door and a motor vehicle.

In recent years design aspects of motor vehicles have become more important. Yet, from today's perspective also environmental topics are an additional factor to be considered in the development of motor vehicles. Although just in its beginning stages, the electrification of motor vehicles in the near future is posing new challenges regarding, for instance, energy supply, energy storage, and energy consumption. Therefore, there is a constant demand from car manufacturers and their suppliers for solutions to these challenges.

As used herein, terms defining directions or positions, such as "left", "right", "front", "rear", "top", "bottom", "inner", "outer", and the like are referring to a view of a motor vehicle from one of the seats. For example, the B pillar is rear of the A pillar but front of the C pillar. Directions or positions of components are typically designated according to their installed positions. It should further be noted that the term "pillar" as used herein is not limited to the usual load bearing pillar of a motor vehicle. The term "pillar" should rather be construed to further include portions of the motor vehicle in the vicinity of the actual load bearing pillars where accommodating and guiding of the window pane takes place.

EP 2 142 394 B1 discloses a guide arrangement for a movable window pane of a motor vehicle. The guide arrangement includes a first movable window pane, and a second movable window pane. The end face of the first window pane and the end face of the second window pane are arranged opposite, and at a distance from, one another. A first guide part is fastened to the first window pane. A second guide part is fastened to the second window pane. Furthermore, a first receptacle for the first guide part, and a second receptacle for the second guide part are provided.

EP 1 794 402 B1 discloses a division bar assembly to be received between an associated fixed window and an associated movable window of a vehicle. The division bar assembly comprises a support adapted to be secured to the associated fixed window, a guide adapted to be affixed to the associated movable window and adapted to extend from an inner surface thereof, and a guide member extending from the support including a cavity dimensioned to receive the guide.

US 2012/0 025 564 A1 discloses a flush glass system module for a motor vehicle door frame defining a window opening having an upper edge and a lower edge for receiving a window having an inner surface. The flush glass system module comprises a front slider adapted to mount to the inner surface of the window. The first applique is disposed entirely on the inner surface side of the window.

DE 10 2005 013 581 B4 discloses a structure of a door window frame of a vehicle having a portion for holding a door window pane. A window pane seal is provided at one end portion of the door window pane. An outer surface of the window seal, an outer surface of the door window pane and an outer surface of an outer wall of the door window frame are flush on the outer side of the vehicle.

DE 10 2014 005 721 B3 discloses a window pane arrangement for a motor vehicle having a window pane. The window pane arrangement comprises a front guiding rail and a rear guiding rail. The window pane is guided in the front guiding rail and the rear guiding rail. At least one of the guiding rails is configured as two-parts having a guiding member and a closure member connected to the guiding member. The guiding member and the closure member define between them a channel for receiving the window pane. The guiding member and the closure member are connected by means of a form-fitting connection.

EP 0 161 685 A2 discloses a construction of a door frame in a motor vehicle, comprising a door frame, a glass run, and a core plate member. The glass run has an outer side portion and an inner side portion. The outer side portion and the inner side portion are in sliding contact with an outer surface and an inner surface of a side end edge of a door glass, respectively, and a bottom portion that connects the outer and inner side portions to each other. Thus, the glass run is configured for vertically slidably guiding the door glass and sealing a space formed between the door glass and the door frame. The core plate member is configured for reinforcing the glass run. The outer side portion is disposed so as to be exposed to the outside of the vehicle, with respect to the door glass. The outer side portion is located at a position where the door glass is shifted toward the outer side portion between the outer side portion and the inner side portion. The outer surface of the door glass is substantially flush with the outer surface of the door frame.

US 2013/0 305 612 A1 discloses a sealing member for a vehicle opening includes a first co-extrusion layer formed from a first elastomeric composition, a second co-extrusion layer formed from a second elastomeric composition, and a third co-extrusion layer formed from a thermoplastic vulcanizate composition. The first co-extrusion layer defines a mounting channel, a window channel, and a front face spaced from the mounting channel and the window channel. The second co-extrusion layer has a portion disposed on the front face of the first co-extrusion layer and a sealing lip disposed on the first co-extrusion layer abutting the portion and extending away from the first co-extrusion layer towards a distal end. The third co-extrusion layer is disposed on the portion and the sealing lip of the second co-extrusion layer for covering segments of the second co-extrusion layer that are visible from an exterior of the vehicle.

The invention is based on the object to provide a smooth transition from the rim portions of a window pane to the neighboring portions of the vehicle.

The object is achieved by a window assembly according to claim 1. Advantageous embodiments of the window assembly are subject-matter of claims 2 to 13. A vehicle door including an advantageous window assembly is subject-matter of claim 14. A vehicle including an advantageous window assembly or an advantageous vehicle door is subject-matter of claim 15.

The invention provides a window assembly for a window opening, in particular a side window opening, of a motor vehicle, which has a front-rear direction and a vertical direction. The window assembly comprises a door frame member, a movable window pane, and a window guiding profile. The door frame member comprises a front pillar, a rear pillar, and an outer surface. The rear pillar is spaced apart from the front pillar along the front-rear direction to the rear. The movable window pane includes a guiding section and a window section. The window section comprises an outer window surface and an inner window surface. The window guiding profile is fastened to the front pillar and includes a sealing portion being configured to seal and/or support the window pane. A front window guiding profile is an example for the window guiding profile. The window guiding profile includes a first guiding portion which is configured to guide the window pane only at the inner window surface. The window guiding profile also includes a second guiding portion which is configured to guide the window pane at the window outer surface and at the window inner surface. With this configuration a flush surface of the motor vehicle is possible. In particular the transition between the window pane and the door frame member, such as a front pillar or rear pillar, can be achieved. Also, with this window assembly, the window guiding profile may provide a loose bearing along the front-rear direction and can compensate for manufacturing tolerance.

Preferably, the window assembly further comprises a waist line substantially extending in the front-rear direction. In particular, the waist line extends between a door frame member, e.g. a front pillar, and another door frame member, e.g. a rear pillar. The waist line may be defined by a window shaft.

The window pane may comprise a window section and a guiding section which are integrally formed as a single unitary member. The window pane is preferably made of a transparent thermoplastic like polycarbonate or poly methyl methacrylate (PMMA), for example. Preferably, the window pane includes a front end face facing to the front. The front end face is particularly interposed between the outer window surface and the inner window surface. Preferably, the window pane includes a rear end face facing to the rear. The rear end face is particularly interposed between the outer window surface and the inner window surface. The guiding section may include a supporting portion. The guiding section can include a guiding arm. The guiding section also may comprise a connecting arm connecting the window section and the guiding arm. Preferably, the guiding section extends along between 50% and 100%, in particular between 70% and 100%, of a dimension of the window section. In particular the guiding section consists of a plurality of guiding elements. Preferably, the guiding elements are equidistantly spaced apart along the dimension of the window section. Preferably, the guiding section comprises a receiving opening. The receiving opening can be defined by the guiding arm and the connecting arm. Preferably the receiving opening extends in a receiving direction which is parallel to the front-rear direction.

In particular, the first guiding portion comprises a sealing portion that is configured to seal and/or to support the window pane exclusively at the inner window surface. Alternatively, the sealing portion is configured to seal and/or to support the window pane exclusively at the front end face. Alternatively, the sealing portion is configured to seal and/or to support the window pane exclusively at the inner window surface and at the front end face simultaneously. Advantageously, the first guiding portion is disposed above the waist line. In particular, the first guiding portion is disposed above the second guiding portion in the vertical direction.

Preferably, the first guiding portion comprises an upper base portion and an upper inner leg portion being connected to the upper base portion. In particular, the upper inner leg portion substantially extends parallel to the window pane when viewed in a horizontal cross-section. The sealing portion is advantageously arranged at the free end of the upper base portion. Alternatively or additionally, the sealing portion is arranged at the free end of the upper inner leg portion. The first guiding portion may include an upper inner supporting lip being configured to engage the inner window surface. The upper inner supporting lip is an example for a sealing portion. Alternatively or additionally, the first guiding portion may include an upper intermediate supporting member being configured to engage the front end face. The upper intermediate supporting member may include an upper intermediate supporting lip. The upper intermediate supporting lip is preferably configured to engage the front end face and the inner window surface. The upper intermediate supporting lip preferably protrudes from the upper intermediate supporting member towards the inner side, in particular towards the upper inner leg portion and/or the upper inner supporting lip. The upper intermediate supporting member and the upper intermediate supporting lip are an example for a sealing portion, respectively.

The second guiding portion may comprise a lower accommodating opening that is configured to accommodate the window pane. The lower accommodating opening preferably extends in a lower accommodating direction substantially parallel to the front-rear direction. In particular, the second guiding portion comprises a lower inner leg portion, a lower outer leg portion, and a lower base portion connecting the lower inner leg portion to the lower outer leg portion. Advantageously, the lower accommodating opening is cooperatively defined by the lower inner leg portion, the lower outer leg portion, and the lower base portion. Preferably, the lower inner leg portion is configured to engage the inner window surface. Advantageously, the lower outer leg portion is configured to engage the outer window surface. The lower base portion may be configured to engage the front end face. Advantageously, the second guiding portion is disposed below the waist line. In particular, the second guiding portion is disposed below the first guiding portion in the vertical direction. The second guiding portion may comprise a sealing portion that is configured to seal and/or to support the window pane at the outer window surface. The sealing portion may further be configured to simultaneously seal and/or support the window pane at the inner window surface. Additionally, the sealing portion may still further be configured to simultaneously seal and/or support the window pane at the front end face. The lower inner leg portion may include a lower inner supporting lip. The lower inner supporting lip advantageously protrudes from the free end of the lower inner leg portion into the lower accommodating opening and preferably towards the lower base portion. The lower outer leg portion may include a lower outer supporting lip. The lower outer supporting lip advantageously protrudes from the free end of the lower outer leg portion into the lower accommodating opening and preferably towards the lower base portion. A lower bottom lip may be provided at any of the lower base portion, the lower inner leg portion, and the lower outer leg portion. The lower bottom lip advantageously protrudes from the transition between the lower base portion and the lower inner leg portion, or the lower base portion and the lower outer leg portion and into the accommodating opening. The lower inner supporting lip, the lower outer supporting lip, and the lower bottom lip are an example of a sealing portion, respectively.

Preferably, the first guiding portion and the second guiding portion are integrally formed as a single unitary member.

The door frame member comprises, for example, a front pillar and a rear pillar. The rear pillar is particularly spaced apart from the front pillar along the front-rear direction to the rear. The window guiding profile, in particular the first guiding portion and the second guiding portion, is disposed at the front pillar. The window assembly may also include a roof frame member, e.g. a roof chassis portion or the like. The window assembly may further include a roof sealing profile that is fastened to the roof frame member. The roof sealing profile substantially extends along the front-rear direction. The roof sealing profile preferably faces the vehicle door, in particular the waist line. The window pane may engage the roof sealing profile, when in a closed position.

The outer surface and the window outer surface are preferably flush. Front outer surfaces of front pillars, rear outer surfaces of rear pillars, and roof outer surfaces are examples for an outer surface, respectively.

The window assembly may further comprise a rear window guiding profile having a fastening portion configured to fasten to the door frame member. The rear window guiding profile may further include an inner guiding leg, an outer guiding leg, and a guiding base. In particular, the guiding base connects the inner guiding leg to the outer guiding leg. The inner guiding leg and the outer guiding leg are examples for a guiding leg, respectively. Preferably, the rear window guiding profile has an accommodating opening configured to accommodate the window pane. The accommodating opening is advantageously defined by the guiding leg and the guiding base. Preferably, the rear window guiding profile is facing the (front) window guiding profile. Advantageously, the rear window guiding profile is spaced apart from the window guiding profile along the front-rear direction. In a preferred embodiment, the rear window guiding profile is disposed at the rear pillar. The rear window guiding profile may act as a fixed bearing for the window pane along the front-rear direction. Manufacturing tolerances are in this case compensated at the window guiding profile to the front.

The rear window guiding profile preferably comprises a sealing portion being configured to seal and/or support the window pane. Advantageously, the sealing portion comprises a sealing lip. The sealing lip is preferably disposed at the guiding leg, in particular the inner guiding leg. The sealing lip may extend into the accommodating opening. The sealing lip can protrude outward from the guiding leg, in particular the inner guiding leg. Preferably, the sealing lip is disposed at the free end of the guiding leg, in particular the inner guiding leg. The sealing lip may engage the window pane. The sealing portion may comprise a pressing lip. The pressing lip is preferably disposed at the guiding leg, in particular the inner guiding leg. The pressing lip may extend into the accommodating opening and preferably towards the outer guiding leg. The pressing lip can protrude outward from the guiding leg, in particular the outer guiding leg. The pressing lip may engage the window pane.

The sealing portion may comprise an intermediate sealing member. The intermediate sealing member can be disposed at the end of the guiding leg, in particular the outer guiding leg. The intermediate sealing member can be spaced apart from the pressing lip along the accommodating direction. In an embodiment, the intermediate sealing member is interposed along the accommodating direction between the guiding base and the door frame member. The intermediate sealing member can include a front contact surface, a rear contact surface, and an exposed surface interposed along the accommodating direction between the front contact surface and the rear contact surface. The exposed surface is preferably recessed or flush with the outer surface and the outer window surface. The intermediate sealing member, in particular any of the front contact surface, the rear contact surface, and the exposed surface may be coated with a lubricant material like lubricant varnish or flock. Advantageously, the sealing portion comprises a bottom lip. The bottom lip is preferably disposed at the guiding leg, in particular the inner guiding leg, and/or the guiding base. The bottom lip may extend into the accommodating opening. Preferably, the pressing lip is interposed along the accommodating direction between the sealing lip and the bottom lip. With this configuration, the flow of force on the window pane can be defined more specifically. The bottom lip can further enhance the sealing properties, in particular regarding moisture and noise. The sealing portion preferably comprises at least one contact surface. The contact surfaces can be suitably coated with any combination of lubricant varnish or flock. Alternatively or additionally, the portions having the contact surfaces may be manufactured, in particular co-extruded, from a lubricant material, such as polyethylene.

The rear window guiding profile may further comprise an inner guiding leg, an outer guiding leg, and a guiding base connecting the inner guiding leg and the outer guiding leg. The inner guiding leg, the outer guiding leg, and the guiding base may be arranged in a U-like or a C-like shape. The sealing lip is preferably disposed at the inner guiding leg or at the outer guiding leg. The pressing lip is preferably disposed at the end of the same guiding leg as the sealing lip. In particular the pressing lip is disposed at the end of the inner guiding leg or at the end of the outer guiding leg. The pressing lip may be interposed along the accommodating direction between the sealing lip and the guiding base. The intermediate sealing member is advantageously disposed at the end of the outer guiding leg or at the end of the inner guiding leg. The counter-pressing lip may be disposed at the end of the intermediate sealing member along the accommodating direction. The bottom lip is preferably disposed at the same guiding leg as the sealing lip and/or the pressing lip. The bottom lip may be disposed at the inner guiding leg or at the outer guiding leg. The bottom lip can be interposed along the accommodating direction between the guiding base and the pressing lip or between the guiding base and the sealing lip. The locating means is preferably disposed at the outer guiding leg. Additionally or alternatively, the locating means is disposed at the inner guiding leg. The locating means may be interposed along the accommodating direction between the guiding base and the intermediate sealing member.

The guiding leg, in particular the outer guiding leg, may comprise a bracket leg defining a receiving opening for receiving a mounting bracket, and extending in the opposite direction relative to the accommodating opening. In this case, the sealing lip can be disposed at the bracket leg. Preferably, the pressing lip may be disposed at the bracket leg, in particular at the end of the bracket leg. Advantageously, the window guiding profile is formed as a single unitary member, preferably from a thermoplastic elastomer or from an elastomer. With this configuration the flow of force guiding the window pane can be controlled further, so that the risk of a movement of the window pane out of the accommodating opening can be further reduced.

The window assembly may further comprise a mounting bracket fastened to the rear window guiding profile. The mounting bracket may serve to reinforce the guiding leg, in particular the outer guiding leg. The mounting bracket is preferably received in the receiving opening. Most preferred, the mounting bracket is encompassed by the guiding leg, in particular the outer guiding leg, and the bracket leg. With this configuration, the window guiding profile can be produced from a more flexible material like a thermoplastic elastomer, for example. Consequently, the window guiding profile can be easily installed. In the installed state, the mounting bracket fastens the window guiding profile to the motor vehicle. The mounting bracket can also provide the necessary stiffness to the window guiding profile which allows a secure guiding of the window pane. Additionally, the mounting bracket may serve as a trimming portion for the vehicle interior. The mounting bracket is preferably integrally formed as a single unitary member using a thermoplastic or a metal, like aluminum.

The window pane may comprise a window section and a guiding section which are integrally formed as a single unitary member. The window pane is preferably made of a transparent thermoplastic like polycarbonate or polymethyl methacrylate (PMMA), for example. The guiding means is advantageously disposed at the end of the guiding section. The guiding section may include a supporting portion. The guiding section also may comprise a connecting arm connecting the window section and the guiding arm. The guiding section can include a reinforcing member, which is advantageously embedded in the guiding arm and/or the connecting arm. Preferably, the guiding section extends along between 50% and 100%, in particular between 70% and 100%, of a dimension of the window section. With this configuration, the window pane is further adapted to optimize the flow of force in order to further reduce the risk of moving out of the accommodating opening.

The invention further provides a vehicle door comprising any of the previous described advantageous embodiments of a window assembly. Still further, the invention provides a vehicle comprising an advantageous embodiment of a vehicle door, or a window assembly.

Further details and advantageous effects of the invention will become apparent in the following detailed description and on the basis of the attached schematic drawings. The figures are listed below:

Figure 1:
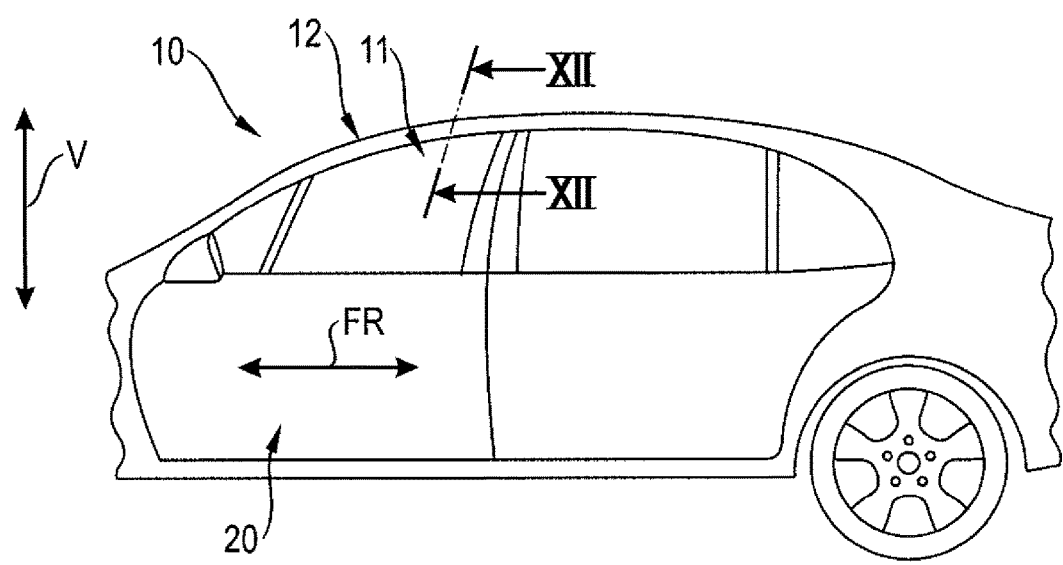
FIG. 1 depicts a partial view of an embodiment of a motor vehicle.

Referring now to FIGS. 1 to 4 and FIG. 12, a first embodiment of a window assembly 190 comprises a front pillar 21, a rear pillar 31, a roof frame member 70, a roof sealing profile 80, a front window guiding profile 100, a window pane 140, and a rear window guiding profile 160.

Referring to FIG. 1, a motor vehicle 10 comprises a front-rear direction FR, a vertical direction V, and a side window opening 11 extending along the front-rear direction FR. The motor vehicle 10 further comprises a vehicle door 20 having the front pillar 21 and the rear pillar 31. The front pillar 21 is disposed towards the front of the vehicle door 20, whereas the rear pillar 31 is disposed towards the rear of the vehicle door 20. It should be noted, that the front pillar 21 and the rear pillar 31 need not be a load bearing structure. The front pillar 21 and the rear pillar 31 are an example for a door frame member, respectively. The vehicle door 20 also includes a waist line W extending between the front pillar 21 and the rear pillar 31 along the front-rear direction FR. The waist line W is usually defined by a portion of the vehicle door 20, such as a window shaft. Consequently, the waist line W in particular separates the visible portion of the window pane 140 from a portion that is received within the vehicle door 20. The same is true for the window guiding profile 100 and the rear window guiding profile 160.

Figure 2:
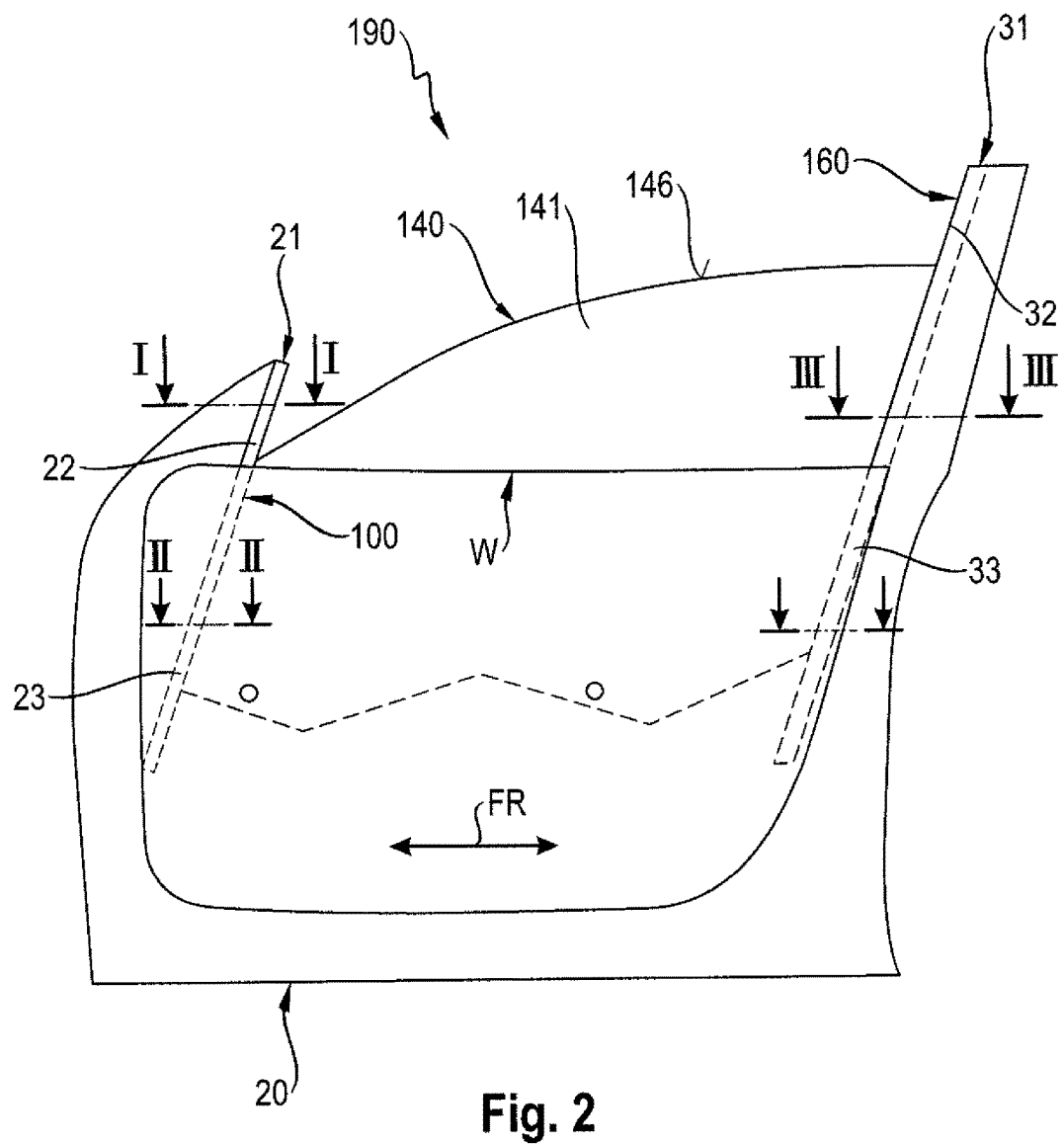
FIG. 2 depicts a schematic view of an embodiment of a vehicle door.
Figure 3:
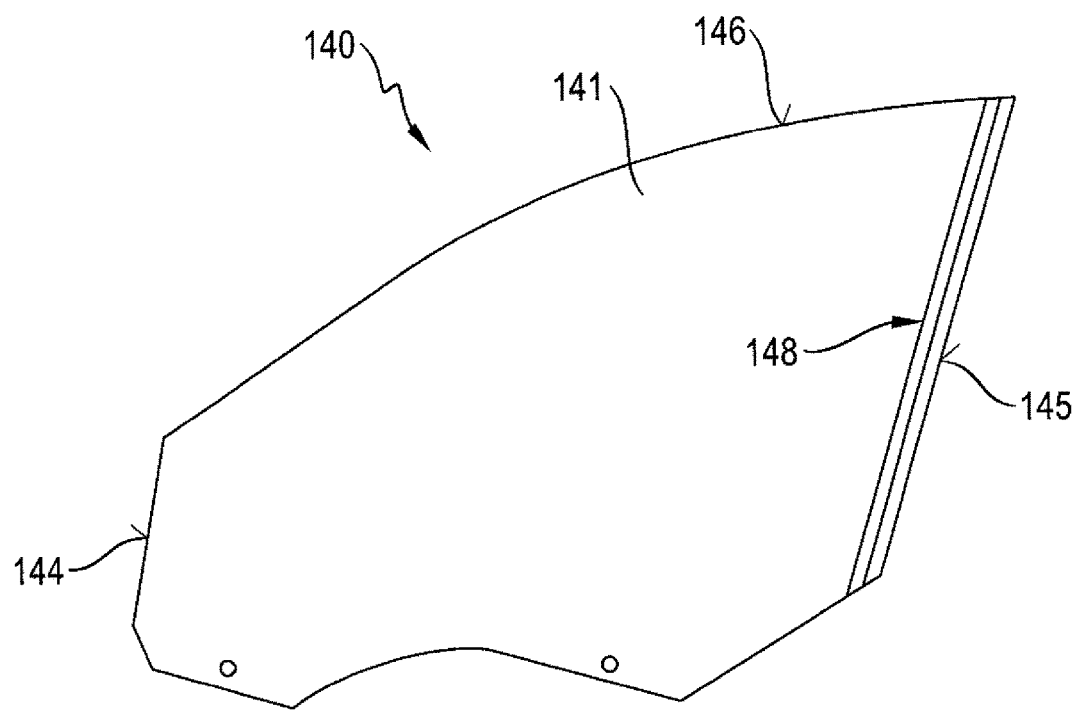
FIG. 3 depicts a schematic view of a first embodiment of a window pane.

Referring now to FIGS. 2 and 3, the front pillar 21 includes an upper front portion 22, a low a front portion 23, a front fastening portion 24, and a front outer surface 25. The upper front portion 22 is arranged above the waist line W, whereas the lower front portion 23 is arranged below the upper front portion 22 along the vertical direction V and, hence, arranged below the waist line W. The front fastening portion 24 is configured to fasten to a window guiding profile. The front fastening portion 24 is arranged at the upper front portion 22 and at the lower front portion 23. The front outer surface 25 is an example for an outer surface and is arranged at the upper front portion 22.

Still referring to FIGS. 2 and 3, the rear pillar 31 includes an upper rear portion 32, a lower rear portion 33, a rear fastening portion 34, and a rear outer surface 35. The upper rear portion 32 is arranged above the waist line W, whereas the lower rear portion 33 is arranged below the upper rear portion 32 along the vertical direction V and, hence, arranged below the waist line W. The rear fastening portion 24 is configured to fasten to a rear window guiding profile. The rear fastening portion 34 is arranged at the upper rear portion 32 and at the lower rear portion 33. The rear outer surface 35 is an example for an outer surface and is arranged at the upper rear portion 32.

Figure 6:
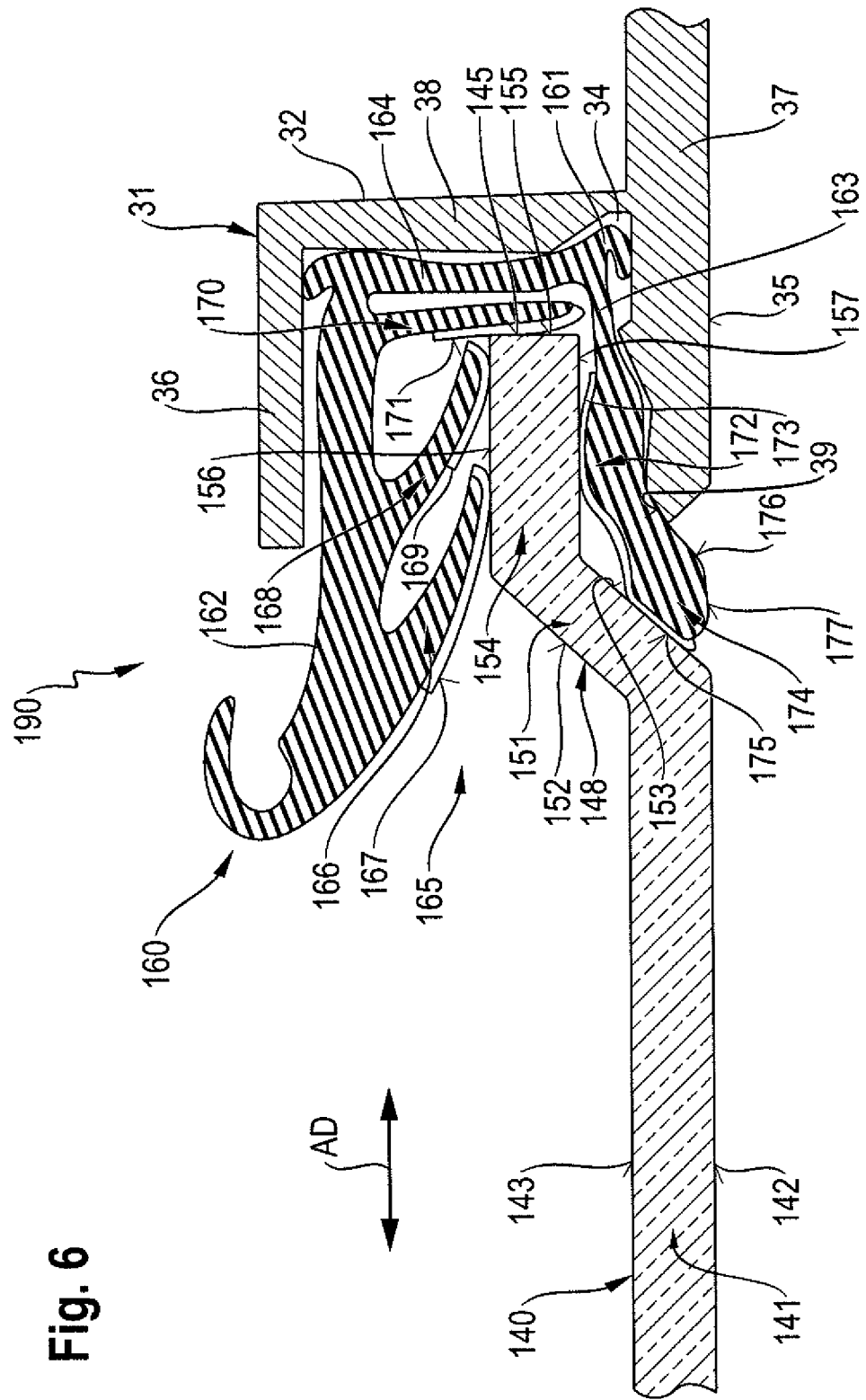
FIG. 6 depicts a cross-section of the first embodiment of the window assembly along line III-III of FIG. 2.

Referring now to FIG. 6, the rear pillar 31 comprises an inner fastening leg 36, an outer fastening leg 37, and a base leg 38. The inner fastening leg 36 and the outer fastening leg 37 extends substantially in parallel towards the front. The base leg 38 connects the inner fastening leg 36 to the outer fastening leg 37. As shown in FIG. 6, the rear outer surface 35 is arranged at the outer fastening leg 37. The rear pillar 31 also comprises a front face 39 which is facing towards the front. The front face 39 is configured to engage a rear window guiding profile. The front face 39 is disposed on the outer fastening leg 37.

Figure 12:
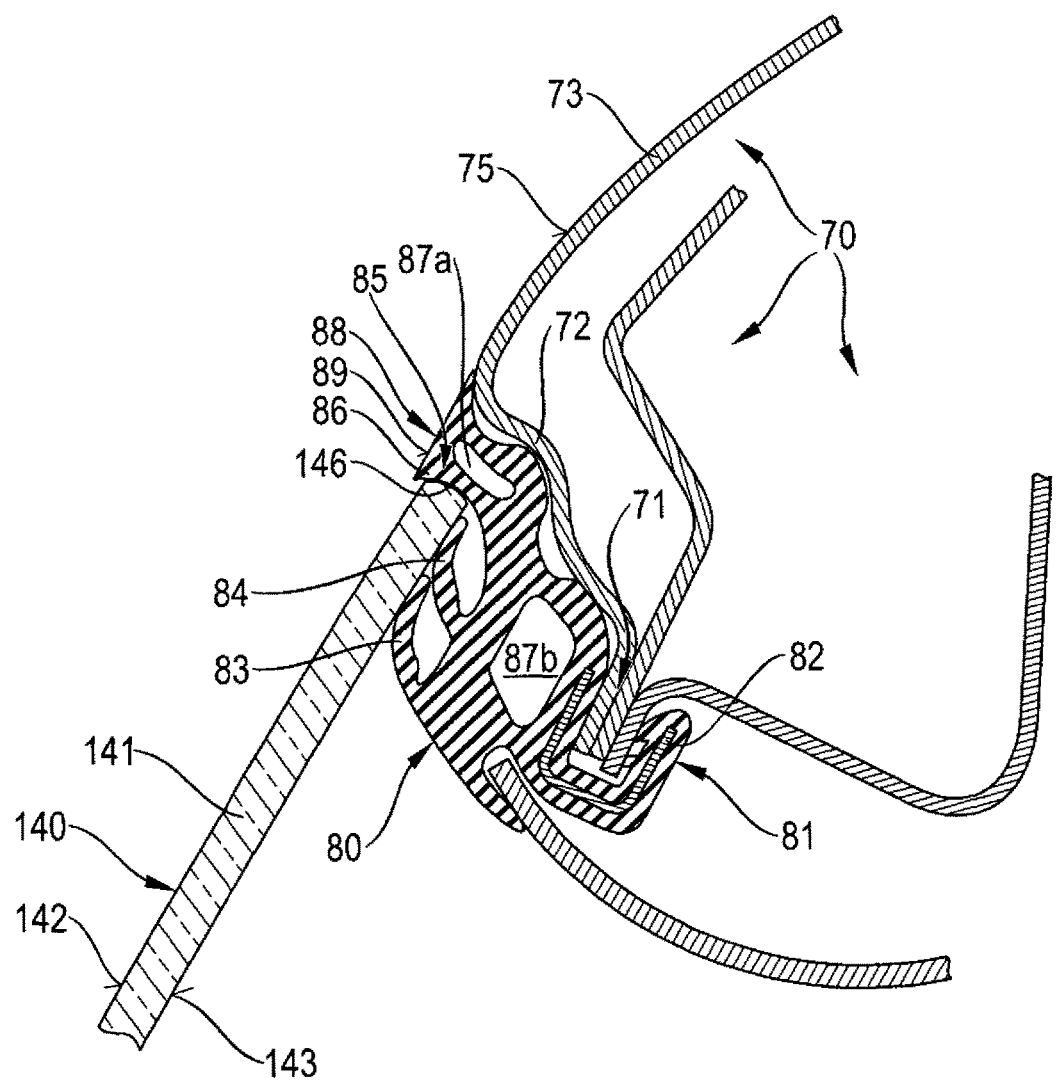
FIG. 12 depicts a cross-section of a first embodiment of a roof sealing profile along line XII-XII of FIG. 1.

Referring now to FIG. 12, the roof frame member 70 includes a fastening frame portion 71, a supporting roof frame portion 72, an outer roof frame portion 73, and a roof outer surface 75. The roof frame member 70 is for example formed by a portion of the chassis. As seen in FIG. 12, the roof frame member 70 may be formed by bent sheets of metal. The fastening frame portion 71 is configured to be fastened to a roof sealing profile. The supporting roof frame portion 72 begins at the fastening frame portion 71 and proceeds to the outer roof frame portion 73. The supporting roof frame portion 71 is configured to support a roof sealing profile. The outer roof frame portion 73 bears the roof outer surface 75. The roof outer surface 75 is an example of an outer surface.

Still referring to FIG. 12, the roof sealing profile 80 includes a fastening portion 81, a sealing lip 83, an intermediate lip 84, and a locating means 85. The fastening portion 81 is configured to fasten to the fastening roof frame portion 71. The fastening portion 81 has embedded therein a reinforcing member 82 preferably made of metal. The sealing lip 83, the intermediate lip 84, and the locating means 85 are configured to engage a window pane, respectively. The intermediate lip 84 is interposed between the sealing lip 83 and the locating means 85 along the vertical direction V. The locating means 85 are configured to prevent a movement of a window pane outward. The locating means 85 include an outer limiter 86 which protrudes on the outer side of the roof sealing profile 80. The outer limiter 86 is configured to form-fittingly engage a window pane, so as to prevent an outward movement of the window pane. The roof sealing profile 80 further comprises a small buffer cavity 87a and a big buffer cavity 87b. The small buffer cavity 87a is disposed adjacent to the locating means 85 and configured to dampen movement along the vertical direction V of a window pane. The big buffer cavity 87b is interposed between the fastening portion 81, and the locating means 85. The big buffer cavity 87b is configured to dampen a movement along the horizontal direction H of a window pane. The roof sealing profile further includes a trimming portion 88 made of a thermoplastic elastomer. The trimming portion 88 comprises a trimming surface 89 which is flush with the roof outer surface 75.

Figure 4:
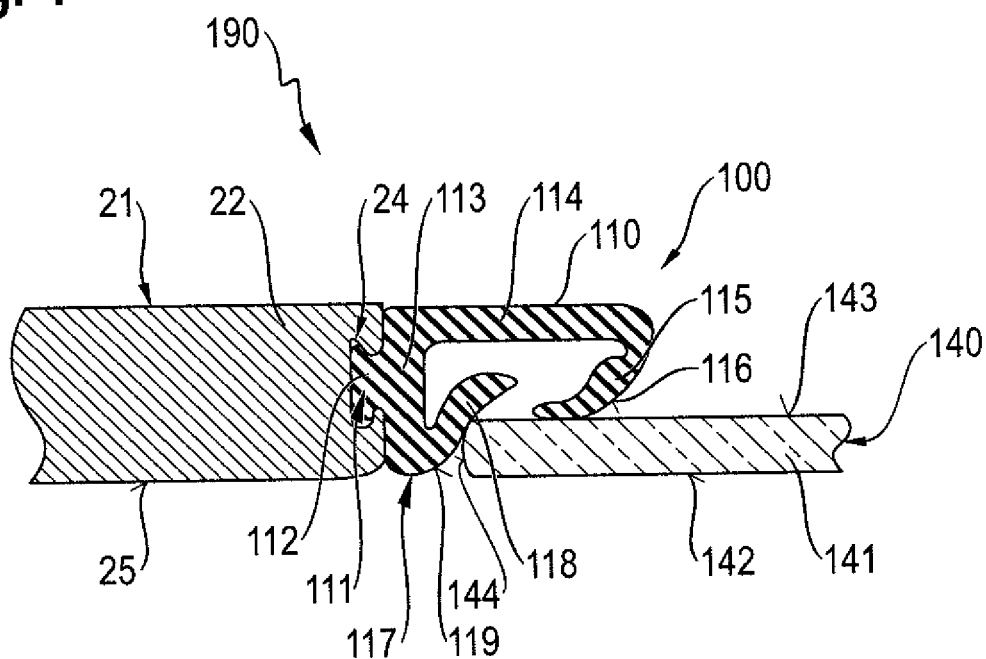
FIG. 4 depicts a cross-section of a first embodiment of a window assembly along line I-I of FIG. 2.
Figure 5:
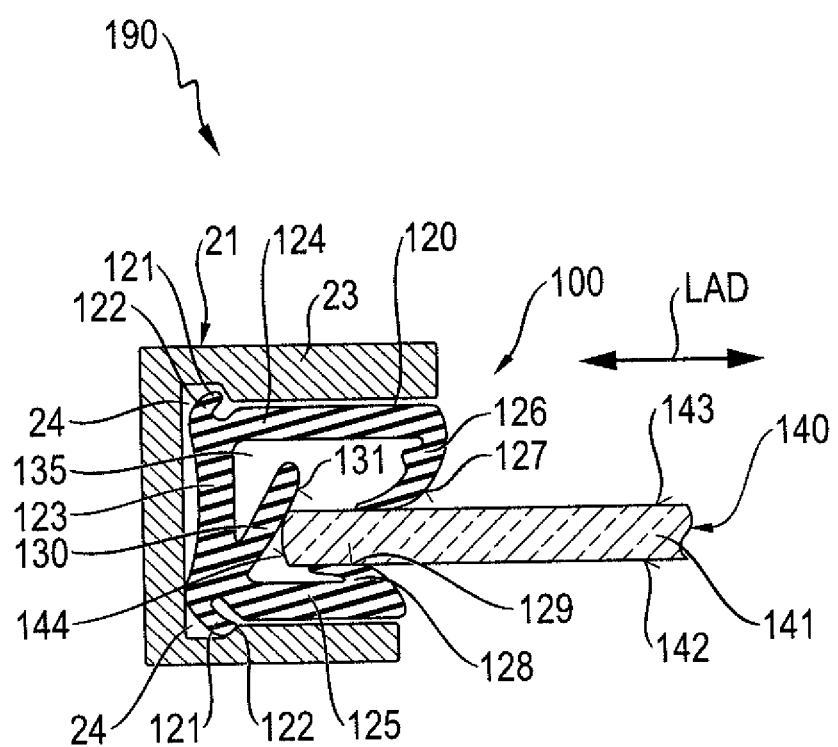
FIG. 5 depicts a cross-section of the first embodiment of the window assembly along line II-II of FIG. 2.

Referring to FIGS. 4 and 5, the front window guiding profile 100 includes an upper front window guiding profile 110 and a lower front window guiding profile 120. The front window guiding profile 100 is an example for a window guiding profile. The front window guiding profile 100 is configured to guide the movement of a window pane.

As shown in FIG. 4, the upper front window guiding profile 110 is configured to guide the window pane at its inner window surface. The upper front window guiding profile 110 is an example for a first guiding portion. The upper front window guiding profile 110 comprises an upper mounting portion 111 and a sealing portion. The upper mounting portion 111 includes an upper mounting protrusion 112 which is configured to form fittingly engage the front pillar 21. The upper front window guiding profile 110 comprises an upper base portion 113 and an upper inner leg portion 114. The upper base portion 113 and the upper inner leg portion 114 are connected to each other at one end. The sealing portion comprises an upper inner supporting lip 115 which is arranged at the free end of the upper inner leg portion 114. The upper inner supporting lip 115 protrudes from the free end of the upper inner leg portion 114 and towards the upper base portion 113. The upper inner supporting lip 115 is configured to engage a window pane with an upper inner supporting surface 116. The sealing portion further comprises an upper intermediate supporting member 117 which is arranged at the free end of the upper base portion 113. The upper intermediate supporting member 117 is configured to engage a window pane. The upper intermediate supporting member includes an upper intermediate supporting lip 118 protruding from the upper intermediate supporting member 117 towards the upper inner leg portion 114. The upper intermediate supporting lip 118 is configured to engage the window pane at an inner window surface with an upper intermediate supporting surface 119.

As shown in FIG. 5, the lower front window guiding profile 120 is configured to guide the window pane at its inner window surface and at its outer window surface. The lower front window guiding profile 120 is an example for a second guiding portion. The lower front window guiding profile 120 comprises lower mounting portion 121, a lower accommodating opening 135, and a sealing portion. The lower mounting portion 121 includes a lower mounting protrusion 122 which is configured to form fittingly engage the front pillar 21. The lower front window guiding profile 120 comprises lower base portion 123, a lower inner leg portion 124, and a lower outer leg portion 125. The lower base portion 123 connects the lower inner leg portion 124 to the lower outer leg portion 125. The sealing portion comprises lower inner supporting lip 125 which is arranged at the free end of the lower inner leg portion 124. The lower inner supporting lip 125 protrudes from the free end of the lower inner leg portion 124 and towards the lower base portion 123. The lower inner supporting lip 125 is configured to engage a window pane with a lower inner supporting surface 126. The sealing portion further comprises a lower outer supporting lip 127 which is arranged at the free end of the lower outer leg portion 125. The lower outer supporting lip 127 is configured to engage a window pane with a lower outer supporting surface 129. The sealing portion further comprises a lower bottom lip 130. The lower bottom lip 130 is arranged at a transition between the lower base portion 123 and the lower outer leg portion 125. The lower bottom lip 130 protrudes into the lower accommodating opening 135 and towards the lower inner leg portion 124. The lower bottom lip 130 is configured to engage a window pane with the lower bottom surface 131. The lower accommodating opening 135 extends along a lower accommodating direction LAD which is parallel to the front-rear direction FR. The lower accommodating opening 135 is configured to accommodate the window pane on all sides then viewed in a horizontal cross-section, as shown in FIG. 5.

Referring now to FIGS. 2 to 6, the window pane 140 comprises a window section 141 and a guiding section 148. The window pane 140 is made of a transparent thermoplastic material, such as polycarbonate or polymethyl methacrylate (PMMA). The term transparent shall be construed to include a configuration wherein the window section 141 serves as a protection against sunlight. The window section 141 and the guiding section 148 are integrally formed as a single unitary member.

The window section 141 and includes an outer window surface 142, an inner window surface 143, a front end face 144, a rear end face 145, and a closing edge 146. The outer window surface 142 is facing outward in the installed position. The inner window surface 143 is facing inward in the installed position. The front end face 144 is facing towards the front in the installed position. The front end face 144 is interposed between the outer window surface 142 and the inner window surface 143. The rear end face 145 is interposed between the outer window surface 142 and the inner window surface 143. The rear end face 145 is spaced apart from the front end face 144 along the front-rear direction FR. The closing edge 146 is interposed between the outer window surface 142 and the inner window surface 143, and extends along the front-rear direction FR between the front end face 144 and the rear end face 145.

The guiding section 148 comprises a connecting arm 151 and a guiding arm 154. The connecting arm 151 protrudes away from the window section 141 on the side of the inner window surface 143 with an angle between 30° and 60°. The connecting arm 151 includes a front connecting surface 152 and a rear connecting surface 153. The front connecting surface 152 is facing to the front, whereas the rear connecting surface 153 is facing to the rear. The front connecting surface 152 is disposed on the side of the inner window surface 142 and the rear connecting surface 153 is disposed on the side of the outer window surface 143. The connecting arm 151 subsequently transitions into the guiding arm 154 which extends substantially in parallel to the window section 141. The guiding arm 154 is disposed inward relative to the window section 141, as shown in FIG. 6. The guiding arm 154 includes a guiding end face 155, an inner guiding surface 156, and an outer guiding surface 157. The guiding end face 155 is interposed between the inner guiding surface 156 and the outer guiding surface 157. In this embodiment the rear end face 145 and the guiding end face 155 are identical. The inner guiding surface 156 is disposed on the side of the inner window surface 143, whereas the outer guiding surface is disposed on the side of the outer window surface 142.

Referring to FIG. 6, the rear window guiding profile 160 is configured to guide the window pane 140 during movement between a closed and an open position. The rear window guiding profile 160 comprises a fastening portion 161, a guiding leg, and a sealing portion. The fastening portion 161 is configured to mount the rear window guiding profile 162 the rear pillar 31. The rear window guiding profile 160 further comprises an inner guiding leg 162, an outer guiding leg 163, and the guiding base 164. The inner guiding leg 162, and the outer guiding leg 163 are examples for a guiding leg, respectively. The inner guiding leg 162 and the outer guiding leg 163 are configured to guide the window pane 140 during movement between a closed and an open position. The inner guiding leg 162, the outer guiding leg 163, and the guiding base 164 are arranged in a substantially U-shaped manner, wherein the guiding base 164 connects the inner guiding leg 162 to the outer guiding leg 163. The inner guiding leg 162, the outer guiding leg 163, and the guiding base define and accommodating opening 165. The accommodating opening 165 extends along and accommodating direction AD which is substantially parallel to the front-rear direction SR. The accommodating opening 165 is configured to accommodate the window pane 140.

The sealing portion comprises a sealing lip 166. The sealing lip 166 is disposed at the free end of the inner guiding leg 162. The sealing lip 166 protrudes from the free end of the inner guiding leg 162 into the accommodating opening 165 and substantially towards the guiding base 164. The sealing lip 166 is configured to engage the window pane 140 with a sealing surface 167. The sealing portion further comprises a pressing lip 168. The pressing lip 168 is interposed between the sealing lip 166 and the guiding base 164 along the front-rear direction FR. The pressing lip 168 protrudes from the inner guiding leg 162 into the accommodating opening 165 and substantially towards the guiding base 164. The pressing lip 168 is configured to engage the window pane 140 with a pressing surface 169. The sealing portion further comprises a bottom lip 170. The bottom lip 170 is disposed at the transition between the inner guiding leg 162 and the guiding base 164. The bottom lip 170 protrudes from the inner guiding leg 162 into the accommodating opening 165 and substantially towards the outer guiding leg 163. The bottom lip 170 protrudes roughly parallel relative to the guiding base 164. The bottom lip 170 is configured to engage the window pane 140 with a bottom surface 171. The sealing portion comprises a sliding protrusion 172. The sliding protrusion 172 protrudes from the outer guiding leg 163 and into the accommodating opening 165. The sliding protrusion 172 has a roughly bulge-like shape. The sliding protrusion 172 is interposed between the free end of the outer guiding leg 163 and the guiding base 164. The sliding protrusion 172 is configured to engage the window pane 140 with the sliding surface 173. The sealing portion further includes an intermediate sealing member 174. The intermediate sealing member 174 is disposed at the free end of the outer guiding leg 163. The intermediate sealing member 174 has a roughly bulge-like shape. The intermediate sealing member 174 has a front contact surface 175, a rear contact surface 176, and an exposed surface 177. The front contact surface 175 is configured to engage the window pane 140. The rear contact surface 176 is configured to engage the rear pillar 31. The exposed surface 177 is interposed between the front contact surface 175 and the rear contact surface 176.

In the following, the window assembly 190 is described in the assembled state and with the window pane 140 in the closed position. The window guiding profile 100 is fastened to the front pillar 21. The rear window guiding profile 160 is fastened to the rear pillar 31. The roof sealing profile 80 is fastened to the roof frame member 70. The window pane 140 is interposed between the front pillar 21 and the rear pillar 31. The window pane 140 is accommodated in the window guiding profile 100 and the rear window guiding profile 160. The window pane 140 is accommodated in such a way that the front outer surface 25, the rear outer surface 35, the roof outer surface 75, and the outer window surface 143 are flush.

Specifically, in the roof sealing profile 80, the sealing lip 83 and the intermediate lip 84 engage the inner window surface 143. The locating means 85 form fittingly engage the window pane 140 so as to prevent a movement in the horizontal direction. Particularly, the outer limiter 86 form fittingly engages the outer window surface 142. More particular, the locating means 85 also engage the closing edge 146. In this configuration, the roof outer surface 75, the trimming surface 89, and the outer window surface 142 are flush.

Specifically, in the first guiding portion 110, the upper inner supporting lip 115 engages the inner window surface 143. Furthermore, the upper intermediate supporting member 117 engages the inner window surface 143. In particular, the upper intermediate supporting member 117 also engages the front end face 144. Also, the upper intermediate supporting member 117 is flush or recessed with respect to the front outer surface 25 and the outer window surface 142. More particularly, the upper intermediate supporting lip 118 engages the front end face 144 and the inner window surface 143 with the upper intermediate supporting surface 119. To facilitate moving of the window pane 140 the upper intermediate supporting surface 119 is coated with lube varnish. The window pane 140 is, thus, sufficiently supported. Consequently, the first guiding portion 110 is configured to guide the window pane 140 only at the inner window surface 143 and the front end face 144.

Specifically, in the second guiding portion 120, the lower inner supporting lip 126 engages the inner window surface 143 with the lower inner supporting surface 127. Furthermore, the lower outer supporting lip 128 engages the outer window surface 142 with the lower outer supporting surface 129. Additionally, the lower bottom lip 130 engages the front end face 144 with the lower bottom surface 131. The contact surfaces, i.e. the lower inner supporting surface 127, the lower outer supporting surface 129, and the lower bottom surface 131 are coated with lube varnish so as to facilitate movement of the window pane 140. Thus, the window pane 140 is accommodated in the lower accommodating opening 135. Consequently, the second guiding portion 120 is configured to guide the window pane 140 simultaneously on the outer window surface 142, and on the inner window surface 143.

Specifically in the rear window guiding profile 160, only the guiding section 148 engages the rear window guiding profile 160. Particularly, the connecting arm 151 only engages the outer guiding leg 163. In contrast, the guiding arm 155 may engage the inner guiding leg 162 and the outer guiding leg 163. More particularly, the connecting arm 151, in particular the rear connecting surface 153, only engages the intermediate sealing member 174 at the front contact surface 175. The guiding arm 154 may contact the inner guiding leg 162 with the guiding end face 155 and the inner guiding surface 156. Specifically, the guiding arm 154 engages the sealing lip 166, the pressing lip 168, and the bottom lip 170, as well as the sliding protrusion 172. To facilitate the movement of the window pane 140, the contact surfaces, i.e. The ceiling surface 167, the pressing surface 169, the bottom surface 171, the sliding surface 173, and the front contact surface 175 are coated with flock.

In this configuration, the rear outer surface 35, and the window outer surface 142 are flush, whereas the exposed surface 177 is recessed with respect to the rear outer surface 35 and the window outer surface 142.

Subsequently, for the embodiments of the window assembly will be described. For the sake of brevity, these embodiments will only be described in so far as they differ the first embodiment as previously described.

Figure 13:
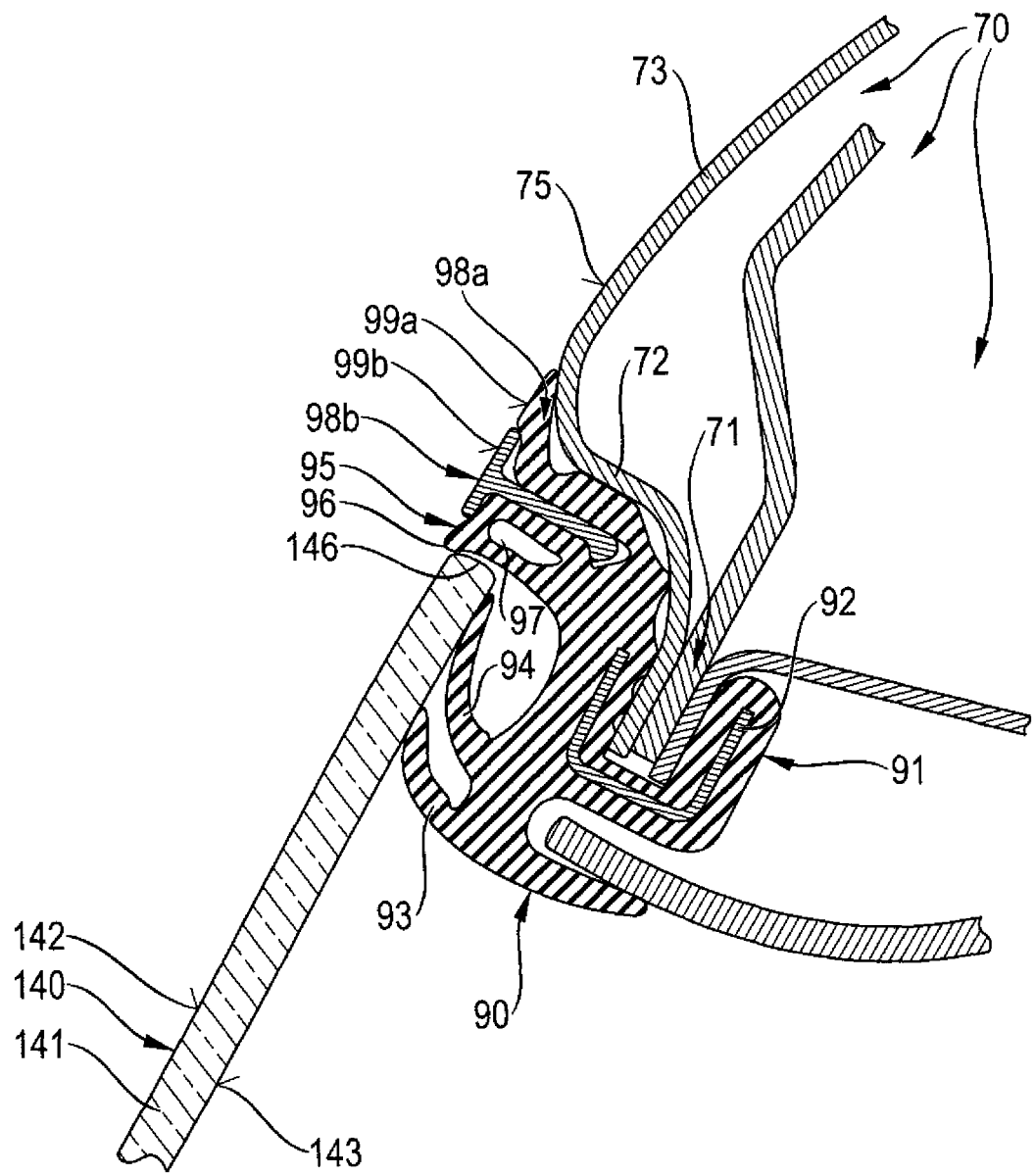
FIG. 13 depicts a cross-section of a second embodiment of a roof sealing profile similar to FIG. 12.
Figure 14:
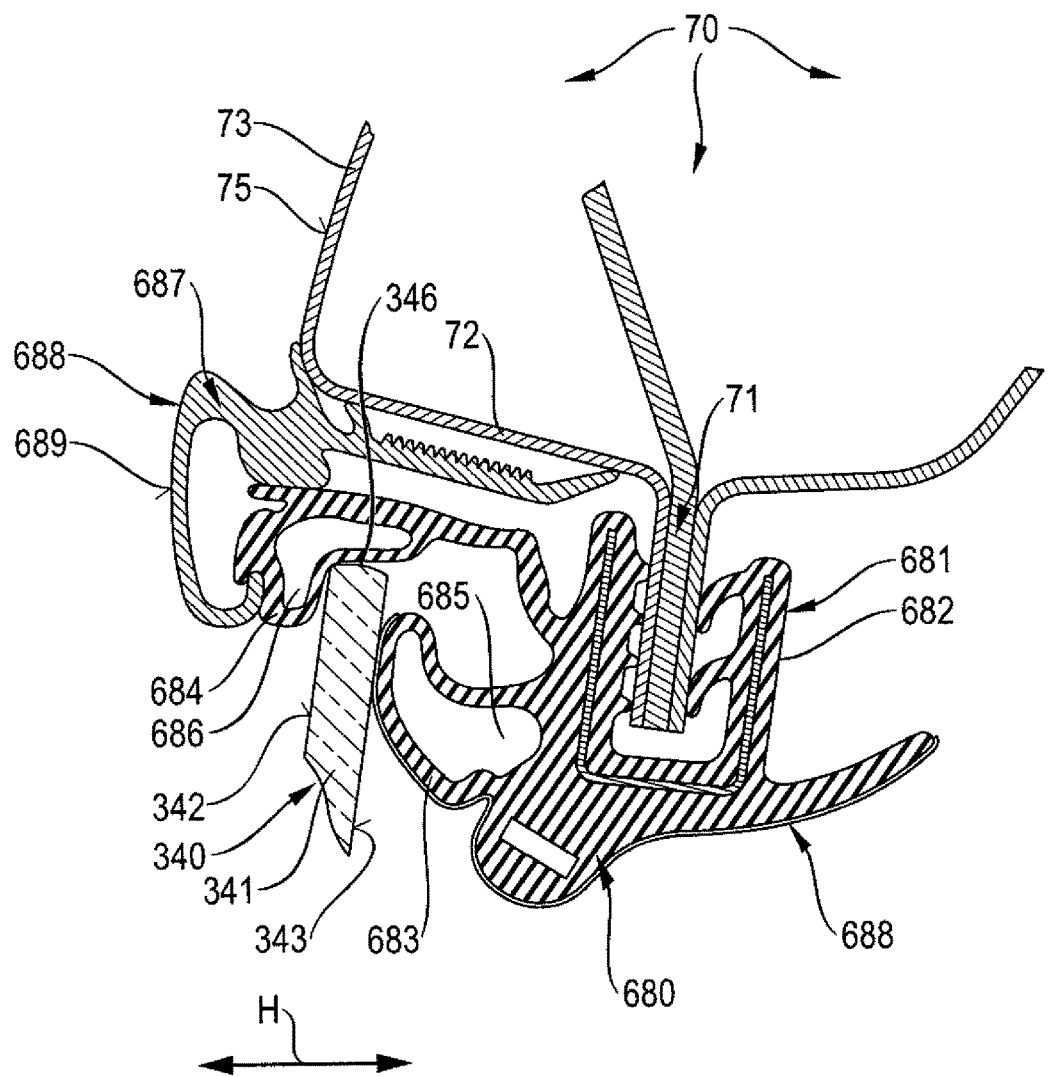
FIG. 14 depicts a cross-section of a third embodiment of a roof sealing profile.

Referring to FIG. 13, a variant of the first embodiment of the window assembly 190 is described. With this variant, a roof sealing profile 90 is provided that includes a fastening portion 91, a sealing lip 93, an intermediate lip 94, and a locating means 95. The fastening portion 91 is configured to fasten to the fastening roof frame portion 71. The fastening portion 91 has embedded therein a reinforcing member 92 preferably made of metal. The sealing lip 93, the intermediate lip 94, and the locating means 95 are configured to engage the window pane 140, respectively. The intermediate lip 94 is interposed between the sealing lip 93 and the locating means 95 along the vertical direction V. The locating means 95 are configured to prevent a movement of the window pane 140 outward. The locating means 95 include an outer limiter 96 which protrudes on the outer side of the roof sealing profile 90. The outer limiter 96 is configured to form-fittingly engage the window pane 140 at the closing edge 146, so as to prevent an outward movement of the window pane 140. The roof sealing profile 90 further comprises a small buffer cavity 97. The small buffer cavity 97 is disposed adjacent to the locating means 95 and configured to dampen movement of the window pane 140 along the vertical direction V. The roof sealing profile 90 further includes a trimming portion 98a made of a thermoplastic elastomer and a trimming member 98b inserted into the roof sealing profile 90. The trimming portion 98a comprises a trimming surface 99a which is flush with the roof outer surface 75. The trimming member 99a comprises a trimming member surface 99b which is flush with the roof outer surface 75.

Figure 7:
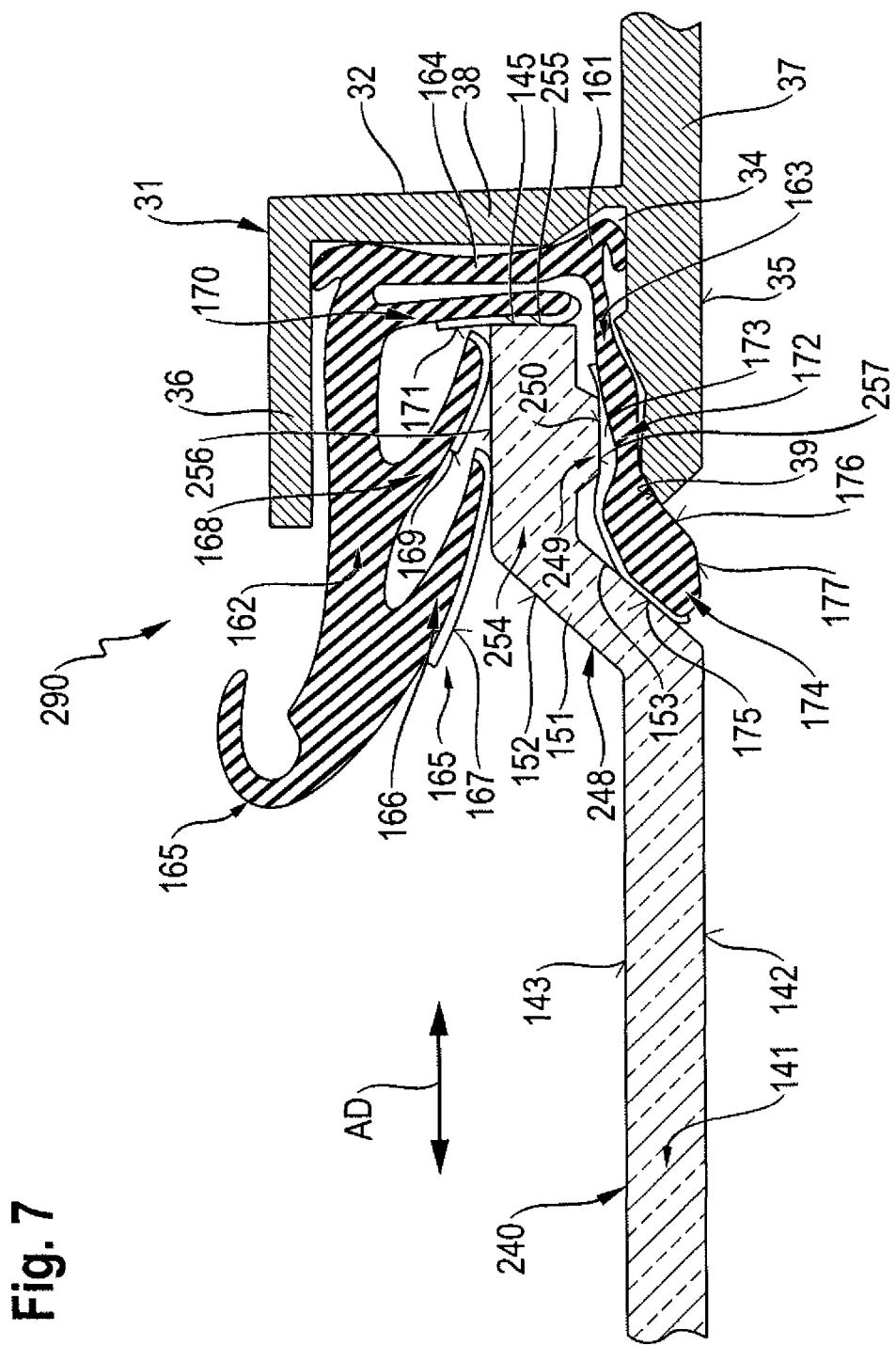
FIG. 7 depicts a cross-section of a second embodiment of a window assembly similar to FIG. 6.

Referring now to FIG. 7, a second embodiment of a window assembly 290 comprises the front pillar 21, the rear pillar 31, the roof frame member 70, the roof sealing member 80, the window guiding profile 100, a window pane 240, and the rear window guiding profile 160. The window pane 240 comprises the window section 141 and a guiding section 248. The window pane 240 is made of a transparent thermoplastic material, such as polycarbonate or polymethyl methacrylate (PMMA). The term transparent shall be construed to include a configuration wherein the window section 241 serves as a protection against sunlight. The window section 141 and the guiding section 248 are integrally formed as a single unitary member.

The guiding section 248 comprises the connecting arm 151, a supporting section 249, and a guiding arm 254. The supporting section 249 protrudes from the guiding arm 254 outward. The supporting section 249 is configured to engage the rear window guiding profile 160 with a supporting surface 250. The guiding arm 254 includes a guiding end face 255, an inner guiding surface 256, and an outer guiding surface 257. The guiding end face 255 is interposed between the inner guiding surface 256 and the outer guiding surface 257. In this embodiment the rear end face 245 and the guiding end face 255 are identical. The inner guiding surface 256 is disposed on the side of the inner window surface 143, whereas the outer guiding surface 257 is disposed on the side of the outer window surface 142.

With the second embodiment, in addition to the previous described assembly, the supporting section 249 engages the outer guiding leg 163 with the supporting surface 250 in the assembled state.

Figure 8:
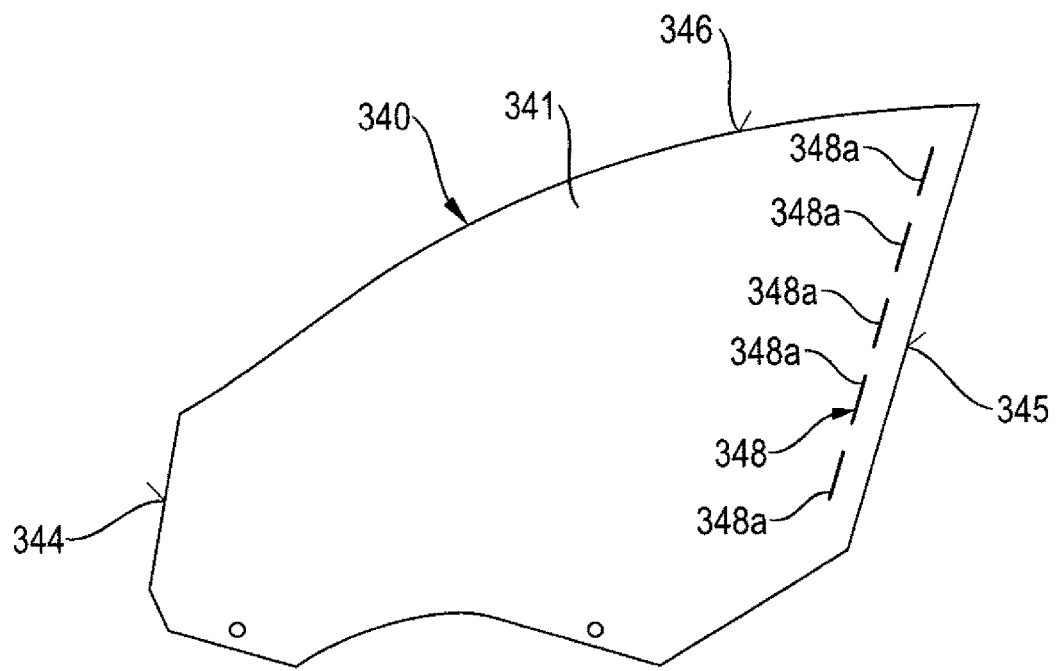
FIG. 8 depicts a schematic view of a second embodiment of a window pane.
Figure 9:
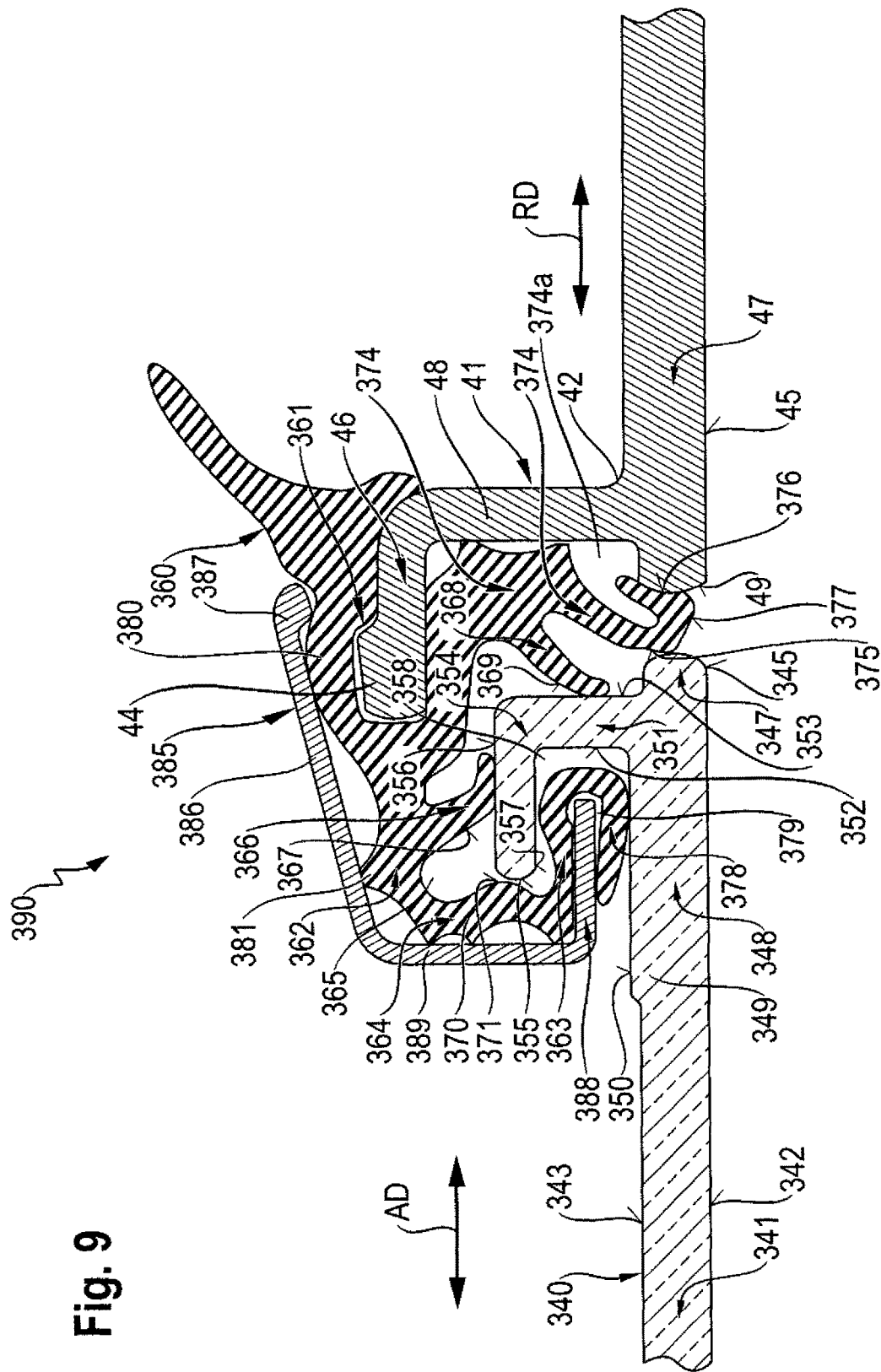
FIG. 9 depicts a cross-section of a third embodiment of a window assembly similar to FIG. 6.

Referring now to FIGS. 8, 9 and 13, a third embodiment of the window assembly 390 comprises the front pillar 21, a rear pillar 41, the roof frame member 70, a roof sealing profile 680, the window guiding profile 100, a window pane 340, a rear window guiding profile 360, and a mounting bracket 385.

The rear pillar 41 includes an upper rear portion 42, a lower rear portion (not shown), a rear fastening portion 44, and a rear outer surface 45. The upper rear portion 42 is arranged above the waist line W, whereas the lower rear portion is arranged below the upper rear portion 42 along the vertical direction V and, hence, arranged below the waist line W. The rear fastening portion 44 is configured to fasten to a rear window guiding profile. The rear fastening portion 44 is arranged at the upper rear portion 42 and at the lower rear portion. The rear outer surface 45 is an example for an outer surface and is arranged at the upper rear portion 42. The rear pillar 41 comprises a fastening leg 46, an outer leg 47, and a base leg 48. The fastening leg 46 and the outer leg 47 extend substantially in parallel towards the front. The base leg 48 connects the fastening leg 46 to the outer leg 47. The rear outer surface 45 is arranged at the outer leg 47. The rear pillar 41 also comprises a front face 49 which is facing towards the front. The front face 49 is configured to engage the rear window guiding profile 360. The front face 49 is disposed on the outer leg 47.

Referring now to FIG. 13, the roof sealing profile 680 includes a fastening portion 681, an inner sealing member 683, and an outer sealing member 684. The fastening portion 681 is configured to fasten to the fastening roof frame portion 71. The fastening portion 681 has embedded therein a reinforcing member 682 preferably made of metal. The inner sealing member 683 and the outer sealing member 684 are configured to engage the window pane 340, respectively. The inner sealing member 683 includes an inner buffer cavity 685 and is configured to engage an inner window surface. The inner buffer cavity 685 is configured to dampen a movement along the horizontal direction H of a window pane. The outer sealing member 684 also includes an outer buffer cavity 686 and is configured to engage an outer window surface and a closing edge. The outer sealing member 684 is configured to prevent an outward movement of a window pane. The outer sealing member 684 is configured to form-fittingly engage a window pane, so as to prevent an outward movement of the window pane. The outer buffer cavity 686 is configured to dampen a movement along the horizontal direction H of a window pane. The roof sealing profile 680 further includes a trimming portion 688 comprising a trimming member 687. The trimming member 687 is made from a thermoplastic elastomer, for example. It is also conceivable that the trimming member 687 is made of metal, like aluminum. The trimming portion 688 further comprises a trimming surface 689 which is provided at the trimming member 687. In this embodiment, the trimming surface 689 is elevated relative to the roof outer surface 75.

The window pane 340 comprises a window section 341 and a guiding section 348. The window pane 340 is made of a transparent thermoplastic material, such as polycarbonate or polymethyl methacrylate (PMMA). The term transparent shall be construed to include a configuration wherein the window section 341 serves as a protection against sunlight. The window section 341 and the guiding section 348 are integrally formed as a single unitary member.

The window section 341 and includes an outer window surface 342, an inner window surface 343, the front end face 144, a rear end face 345, a closing edge 346, and a rear end portion 347. The outer window surface 342 is facing outward in the installed position. The inner window surface 343 is facing inward in the installed position. The rear end face 345 is interposed between the outer window surface 342 and the inner window surface 343. The rear end face 345 is disposed at the rear end portion 347 and configured to engage the rear window guiding profile 360. The closing edge 346 is interposed between the outer window surface 342 and the inner window surface 343, and extends along the front-rear direction FR.

The guiding section 348 comprises a plurality of guiding elements 348a. The guiding elements 348a are substantially identical and equidistantly spaced apart from each other. The guiding section 348 comprises a connecting arm 351 and a guiding arm 354 forming one of the guiding elements 348a, respectively. The connecting arm 351 protrudes away from the window section 341, roughly orthogonal to the window section 341, and on the side of the inner window surface 343. The connecting arm 351 includes a front connecting surface 352 and a rear connecting surface 353. The front connecting surface 352 is facing to the front, whereas the rear connecting surface 353 is facing to the rear. The connecting arm 351 subsequently transitions into the guiding arm 354 which protrudes from the connecting arm 351 and extends substantially in parallel to the window section 341 to the front. The guiding arm 354 is disposed inward relative to the window section 341, as shown in FIG. 9. The guiding arm 354 includes a guiding end face 355, an inner guiding surface 356, and an outer guiding surface 357. The guiding end face 355 is interposed between the inner guiding surface 356 and the outer guiding surface 357. The guiding section 348 further comprises a supporting section 349. The supporting section 349 is disposed adjacent to the rear end portion 347 and protrudes inward. The supporting section 349 includes a supporting surface 350 which may be coated with a lube material. The guiding section 348 comprises a receiving opening 358. The receiving opening 358 extends along a receiving direction RD which is parallel to the front-rear direction FR.

The rear window guiding profile 360 comprises a fastening portion 361, an inner guiding leg 362, an outer guiding leg 363, and a guiding base 364. The rear window guiding profile 360 further comprises a bracket fastening portion 380 configured to fasten to the mounting bracket 385, and a bracket support 381 configured to support the mounting bracket 385. The fastening portion 361 takes the shape of a notch, a channel, or a furrow. The fastening portion 361 is disposed at the inner guiding leg 362. The inner guiding leg 362 and the outer guiding leg 363 are an example for a guiding leg, respectively. The inner guiding leg 362, the outer guiding leg 363, and the guiding base 364 define an accommodating opening 365. The accommodating opening 365 extends along an accommodating direction AD which is parallel to the front-rear direction FR. The accommodating opening 365 extends in the opposite direction relative to the receiving opening 358. The accommodating opening 365 has a roughly rectangular cross-section.

The inner guiding leg 362 has connected to its end an intermediate sealing member 374. The outer guiding leg 363 has connected to its end a bracket leg 378 which proceeds back in the opposite direction relative to the outer guiding leg 363. The outer guiding leg 363 and the bracket leg 374 thus de-fine a bracket opening 379. The bracket opening 379 extends opposite relative to the accommodating opening 365.

The sealing portion comprises a sealing lip 366. The sealing lip 366 is disposed at the inner guiding leg 362. The sealing lip 366 protrudes from the inner guiding leg 362 into the accommodating opening 365 and substantially towards the outer guiding leg 363. The sealing lip 366 is configured to engage the window pane 340 with a sealing surface 367. The sealing portion further comprises a pressing lip 368. The pressing lip 368 is interposed between the sealing lip 166 and the intermediate sealing member 374 along the front-rear direction FR. The pressing lip 368 protrudes from the inner guiding leg 362 into the accommodating opening 365 and substantially towards the guiding base 364. The pressing lip 368 is configured to engage the window pane 340 with a pressing surface 369. The sealing portion further comprises a bottom bulge 370. The bottom bulge 370 is disposed at the guiding base 364. The bottom bulge 370 protrudes from the guiding base 363 into the accommodating opening 365. The bottom bulge 370 has a bulge-like shape. The bottom bulge 370 is configured to engage the window pane 340 with a bottom surface 371. The sealing portion comprises a sliding protrusion 372. The sliding protrusion 372 protrudes from the outer guiding leg 363 and into the accommodating opening 365. The sliding protrusion 372 has a roughly bulge-like shape. The sliding protrusion 372 is interposed between the free end of the outer guiding leg 363 and the guiding base 364. The sliding protrusion 372 is configured to engage the window pane 340 with a sliding surface 373. The intermediate sealing member 374 is an example for a sealing portion and includes a front contact surface 375, a rear contact surface 376, and an exposed surface 377. The intermediate sealing member 374 is formed as a sealing lip bending back on itself and further includes a cavity 374a. The cavity 374a is defined by the intermediate sealing member 374 and the rear pillar 41. The front contact surface 375 is configured to contact the window pane 340, whereas the rear contact surface 376 is configured to contact the rear pillar 41. The front contact surface 375 and the rear contact surface 376 are an example for a contact surface, respectively. The exposed surface 377 is facing outward. The exposed surface 377 is interposed between the front contact surface 375 and the rear contact surface 376.

The mounting bracket 385 is made of a thermoplastic or a metal, such as steel or aluminum. The mounting bracket 385 may thus serve as a trimming portion. The mounting bracket 385 includes a fastening limb 386, a reinforcing limb 388, and an intermediate limb 389. The fastening limb 386 is configured to form-fittingly engage the rear window guiding profile 360 and comprises a fastening protrusion 387. The fastening limb 386, the reinforcing limb 388, and the intermediate limb 389 are roughly arranged in a C-shape. The intermediate limb 389 connects the fastening limb 386 to the reinforcing limb 388.

Figure 10:
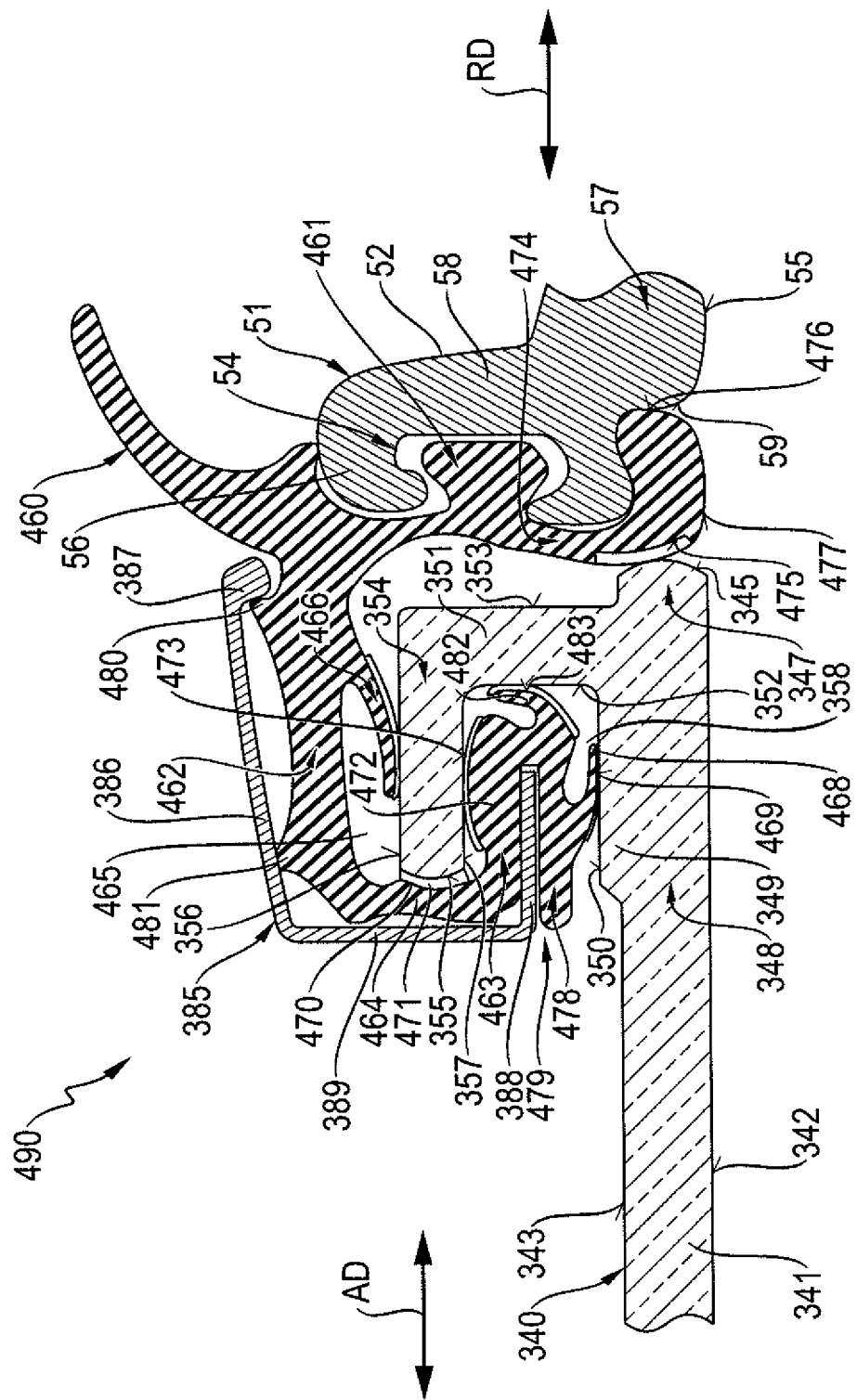
FIG. 10 depicts a cross-section of a fourth embodiment of a window assembly similar to FIG. 6.

In the assembled state, the guiding section 348 is accommodated in the accommodating opening 365, as shown in FIG. 9. The arrangement concerning the window guiding profile 100 is substantially the same as with the first embodiment. Referring now to FIG. 10, a fourth embodiment of a window assembly 490 comprises the front pillar 21, a rear pillar 51, the roof frame member 70, the roof sealing profile 80, the window pane 340, a rear window guiding profile 460, and the mounting bracket 385.

The rear pillar 51 includes an upper rear portion 52, a lower rear portion (not shown), a rear fastening portion 54, and a rear outer surface 55. The upper rear portion 52 is arranged above the waist line W, whereas the lower rear portion is arranged below the upper rear portion 52 along the vertical direction V and, hence, arranged below the waist line W. The rear fastening portion 54 is configured to fasten to a rear window guiding profile. The rear fastening portion 44 is arranged at the up-per rear portion 52 and at the lower rear portion. The rear outer surface 45 is an example for an outer surface and is arranged at the upper rear portion 42. The rear pillar 51 comprises an inner leg 56, an outer leg 57, and a base leg 58. The inner leg 46 is hook-shaped. The outer leg 47 also has a hook-shape on its front end. The outer leg 47 extends substantially parallel to the front-rear direction FR. The base leg 58 connects the inner leg 56 to the outer leg 57. The rear outer surface 55 is arranged at the outer leg 57. The rear pillar 51 also comprises a front face 59 which is facing towards the front. The front face 59 is configured to engage the rear window guiding profile 460. The front face 59 is disposed on the outer leg 57.

The rear window guiding profile 460 comprises a fastening portion 461, an inner guiding leg 462, an outer guiding leg 463, and a guiding base 364. The rear window guiding profile 460 further comprises a bracket fastening portion 480 configured to fasten to the mounting bracket 385, and a bracket support 481 configured to support the mounting bracket 385. The fastening portion 461 takes the shape of a mushroom-shaped protrusion. The fastening portion 461 is disposed at the inner guiding leg 462. The inner guiding leg 462 and the outer guiding leg 463 are an example for a guiding leg, respectively. The inner guiding leg 462, the outer guiding leg 463, and the guiding base 464 define an accommodating opening 465. The accommodating opening 465 extends along an accommodating direction AD which is parallel to the front-rear direction FR. The accommodating opening 465 extends in the opposite direction relative to the receiving opening 358. The accommodating opening 465 has a roughly rectangular cross-section.

The inner guiding leg 462 has connected to its end an intermediate sealing member 474. Specifically, the intermediate sealing member 474 is disposed adjacent to the fastening portion 461. The outer guiding leg 463 has connected to its end a bracket leg 478 which proceeds back in the opposite direction relative to the outer guiding leg 463. The outer guiding leg 463 and the bracket leg 474 thus define a bracket opening 479. The bracket opening 479 extends opposite relative to the accommodating opening 465.

The sealing portion comprises a sealing lip 466. The sealing lip 466 is disposed at the inner guiding leg 462. The sealing lip 466 protrudes from the inner guiding leg 462 into the accommodating opening 465 and substantially towards the outer guiding leg 463 and the guiding base 464. The sealing lip 466 is configured to engage the window pane 340 with a sealing surface 467 coated with flock. The sealing portion further comprises a pressing lip 468. The pressing lip 468 protrudes from the bracket leg 478 outward. The pressing lip 468 is configured to engage the window pane 340 with a pressing surface 469 which is coated with flock. The sealing portion further comprises a bottom dent 470. The bottom dent 470 is disposed at the guiding base 464. The bottom dent 470 recesses into the guiding base 463. The bottom dent 470 is configured to engage the window pane 340 with a bottom surface 471 coated with flock. The sealing portion comprises a sliding protrusion 472. The sliding protrusion 472 protrudes from the outer guiding leg 463 and into the accommodating opening 465. The sliding protrusion 472 has a roughly bulge-like shape. The sliding protrusion 472 is interposed between the free end of the outer guiding leg 463 and the guiding base 464. The sliding protrusion 472 is configured to engage the window pane 340 with a sliding surface 473 coated with flock. The intermediate sealing member 474 is an example for a sealing portion and includes a front contact surface 475, a rear contact surface 476, and an exposed surface 477. The intermediate sealing member 474 is formed adjacent to the fastening portion 461. The front contact surface 475 is configured to contact the window pane 340 and is coated with flock. The rear contact surface 476 is configured to contact the rear pillar 51. The front contact surface 475 and the rear contact surface 476 are an example for a contact surface, respectively. The exposed surface 477 is facing outward. The exposed surface 477 is interposed between the front contact surface 475 and the rear contact surface 476. The sealing portion comprises an intermediate sealing lip 482. The intermediate sealing lip 482 is interposed between the sliding protrusion 472 and the pressing lip 468. The intermediate sealing lip 482 protrudes from the transition between the outer guiding leg 463 and the bracket leg 478 into the accommodating opening 465 and substantially towards the fastening portion 461. The intermediate sealing lip 482 is configured to engage the window pane 340 with an intermediate sealing surface 483 coated with flock.

Figure 11:
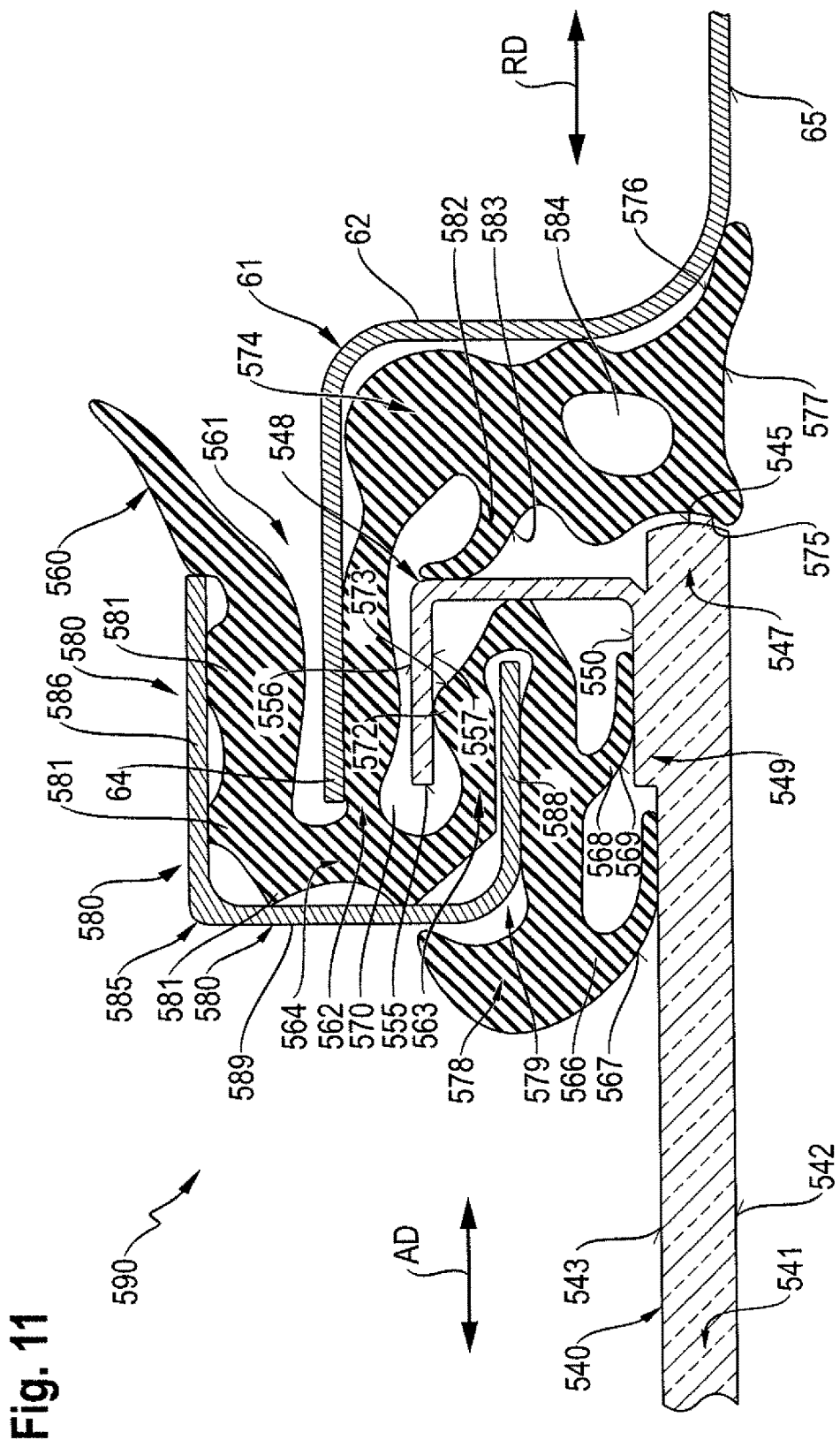
FIG. 11 depicts a cross-section of a fifth embodiment of a window assembly similar to FIG. 6.

Referring now to FIG. 11, a fifth embodiment of a window assembly 590 comprises the front pillar 21, a rear pillar 61, the roof frame member 70, the roof sealing profile 80, the window guiding profile 100, a window pane 540, a rear window guiding profile 560, and a mounting bracket 585. The rear pillar 61 includes an upper rear portion 62, a lower rear portion (not shown), a rear fastening portion 64, and a rear outer surface 65. The rear pillar 61 is formed from a bent sheet of metal. The upper rear portion 62 is arranged above the waist line W, whereas the lower rear portion is arranged below the upper rear portion 62 along the vertical direction V and, hence, arranged below the waist line W. The rear fastening portion 64 is configured to fasten to the rear window guiding profile 560. The rear fastening portion 64 is arranged at the upper rear portion 62 and at the lower rear portion. The rear outer surface 65 is an example for an outer surface and is arranged at the upper rear portion 62. The rear pillar 61 comprises an inner leg 66, an outer leg 67, and a base leg 68. The outer leg 67 extends substantially parallel to the front-rear direction FR. The base leg 68 connects the inner leg 66 to the outer leg 67. The rear outer surface 65 is arranged at the outer leg 67. The rear pillar 61 also comprises a front face 69 which is facing towards the front. The front face 69 is configured to engage the rear window guiding profile 560. The front face 69 is disposed on the outer leg 67.

The window pane 540 comprises a window section 541 and a guiding section 548. The window pane 540 is made of a transparent thermoplastic material, such as polycarbonate or polymethyl methacrylate (PMMA). The term transparent shall be construed to include a configuration wherein the window section 541 serves as a protection against sunlight. The window section 541 and the guiding section 548 are integrally formed as a single unitary member.

The window section 541 and includes an outer window surface 542, an inner window surface 543, the front end face 144, a rear end face 545, a closing edge 546, and a rear end portion 547. The outer window surface 542 is facing outward in the installed position. The inner window surface 543 is facing inward in the installed position. The rear end face 545 is interposed between the outer window surface 542 and the inner window surface 543. The rear end face 545 is disposed at the rear end portion 547 and configured to engage the rear window guiding profile 560. The closing edge 546 is interposed between the outer window surface 542 and the inner window surface 543, and extends along the front-rear direction FR.

The guiding section 548 is formed as a single member, similar to the first embodiment, and comprises a connecting arm 551 and a guiding arm 554. The connecting arm 551 protrudes away from the window section 541, roughly orthogonal to the window section 541, and on the side of the inner window surface 543. The connecting arm 551 includes a front connecting surface 552 and a rear connecting surface 553. The front connecting surface 552 is facing to the front, whereas the rear connecting surface 553 is facing to the rear. The connecting arm 551 subsequently transitions into the guiding arm 554 which protrudes from the connecting arm 551 and extends substantially in parallel to the window section 541 to the front. The guiding arm 554 is disposed inward relative to the window section 541. The guiding arm 554 includes a guiding end face 555, an inner guiding surface 556, and an outer guiding surface 557. The guiding end face 555 is interposed between the inner guiding surface 556 and the outer guiding surface 557. The guiding section 548 further comprises a supporting section 549. The supporting section 549 is disposed adjacent to the rear end portion 547 and protrudes inward. The supporting section 549 includes a supporting surface 550 which may be coated with a lube material. The guiding section 548 comprises a receiving opening 558. The receiving opening 558 extends along a receiving direction RD which is parallel to the front-rear direction FR.

The rear window guiding profile 560 comprises a fastening portion 561, an inner guiding leg 562, an outer guiding leg 563, and a guiding base 364. The rear window guiding profile 560 further comprises a bracket fastening portion 580 configured to fasten to the mounting bracket 585, and a bracket support 581 configured to support the mounting bracket 585. The fastening portion 561 takes the shape of a channel. The fastening portion 561 is disposed at the inner guiding leg 562. The inner guiding leg 562 and the outer guiding leg 563 are an example for a guiding leg, respectively. The inner guiding leg 562, the outer guiding leg 563, and the guiding base 564 define an accommodating opening 565. The accommodating opening 565 extends along an accommodating direction AD which is parallel to the front-rear direction FR. The accommodating opening 565 extends in the opposite direction relative to the receiving opening 558. The accommodating opening 565 has a roughly rectangular cross-section.

The inner guiding leg 562 has connected to its end an intermediate sealing member 574. The outer guiding leg 563 has connected to its end a bracket leg 578 which proceeds back in the opposite direction relative to the outer guiding leg 563. The outer guiding leg 563 and the bracket leg 574 thus define a bracket opening 579. The bracket opening 579 extends opposite relative to the accommodating opening 565.

The sealing portion comprises a sealing lip 566. The sealing lip 566 is disposed at the end of the bracket leg 578. The sealing lip 566 protrudes from the bracket leg 578 outward. The sealing lip 566 is configured to engage the window pane 540 with a sealing surface 567 coated with lubricant varnish. The sealing portion further comprises a pressing lip 568. The pressing lip 568 protrudes from the bracket leg 578 outward. The pressing lip 568 is interposed between the sealing lip 566 and the intermediate sealing member 574. The pressing lip 568 is configured to engage the window pane 540 with a pressing surface 569 which is coated with lubricant varnish. The sealing portion further comprises a bottom cavity 570. The bottom cavity 570 is disposed at the guiding base 564. The bottom cavity 570 recesses into the guiding base 563. The bottom cavity 570 is configured to accommodate but not engage the window pane 540. The sealing portion comprises a sliding protrusion 572. The sliding protrusion 572 protrudes from the outer guiding leg 563 and into the accommodating opening 565. The sliding protrusion 572 has a roughly bulge-like shape. The sliding protrusion 572 is interposed between the free end of the outer guiding leg 563 and the guiding base 564. The sliding protrusion 572 is configured to engage the window pane 340 with a sliding surface 573 coated with lubricant varnish. The intermediate sealing member 574 is an example for a sealing portion and includes a front contact surface 575, a rear contact surface 576, and an exposed surface 577. The intermediate sealing member 574 is at the end of the inner guiding leg 562. The front contact surface 575 is configured to contact the window pane 540 and is coated with lubricant varnish. The rear contact surface 576 is configured to contact the rear pillar 61. The front contact surface 575 and the rear contact surface 576 are an example for a contact surface, respectively. The exposed surface 577 is facing outward. The exposed surface 577 is interposed between the front contact surface 575 and the rear contact surface 576. The intermediate sealing member 574 is formed as a hollow profile member and includes an intermediate cavity 584 configured to dampen vibrations of the window pane 540. The sealing portion comprises an intermediate sealing lip 582. The intermediate sealing lip 582 is disposed at the intermediate sealing member 574. The intermediate sealing lip 582 protrudes from the intermediate sealing member 574 into the accommodating opening 565 and substantially towards the guiding base 564. The intermediate sealing lip 582 is configured to engage the window pane 540 with an intermediate sealing surface 583 coated with lubricant varnish.

With the window assemblies previously described, a flush transition from the outer window surface to a door frame member and/or a roof frame member may be implemented. Not only does this improve the optics, it also serves to lower wind resistance. Additionally, the previously described window assemblies allow to omit part of a vehicle door frame and are built from low weight materials, thereby reducing weight. Thus, the described window assemblies are particularly suited for electric driven vehicles.

LIST OF REFERENCE SIGNS 10 motor vehicle
11 side window opening 12 roof member
20 vehicle door
21 front pillar (door frame member)
22 upper front portion
23 lower front portion
24 front fastening portion
25 front outer surface (outer surface)
31 rear pillar (door frame member)
32 upper rear portion
33 lower rear portion
34 rear fastening portion
35 rear outer surface (outer surface)
36 inner fastening leg
37 outer fastening leg
38 base leg
39 front face
41 rear pillar (door frame member)
42 upper rear portion
44 rear fastening portion
45 rear outer surface (outer surface)
46 fastening leg
47 outer leg
48 base leg
49 front face
51 rear pillar (door frame member)
52 upper rear portion
54 rear fastening portion
55 rear outer surface (outer surface)
56 inner leg
57 outer leg
58 base leg
59 front face
61 rear pillar (door frame member)
62 upper rear portion
64 rear fastening portion
65 rear outer surface (outer surface)
70 roof frame member
71 fastening roof frame portion
72 supporting roof frame portion
73 outer roof frame portion
75 roof outer surface (outer surface)
80 roof sealing profile
81 fastening portion
82 reinforcing member
83 sealing lip
84 intermediate lip
85 locating means
86 outer limiter
87a small buffer cavity
87b big buffer cavity
88 trimming portion
89 trimming surface
90 roof sealing profile
91 fastening portion
92 reinforcing member
93 sealing lip
94 intermediate lip
95 locating means
96 outer limiter
97 buffer cavity
98a trimming portion
98b trimming member
99a trimming surface
99b trimming member surface
100 front window guiding profile (window guiding profile)
110 upper front window guiding profile (first guiding portion)
111 upper mounting portion
112 upper mounting protrusion
113 upper base portion
114 upper inner leg portion
115 upper inner supporting lip (sealing portion)
116 upper inner supporting surface (contact surface)
117 upper intermediate supporting member (sealing portion)
118 upper intermediate supporting lip (sealing portion)
119 upper intermediate supporting surface (contact surface)
120 lower front window guiding profile (second guiding portion)
121 lower mounting portion
122 lower mounting protrusion
123 lower base portion
124 lower inner leg portion
125 lower outer leg portion
126 lower inner supporting lip (sealing portion)
127 lower inner supporting surface (contact surface)
128 lower outer supporting lip (sealing portion)
129 lower outer supporting surface (contact surface)
130 lower bottom lip (sealing portion)
131 lower bottom surface (contact surface)
135 lower accommodating opening
140 window pane
141 window section
142 outer window surface
143 inner window surface
144 front end face
145 rear end face
146 closing edge
148 guiding section
151 connecting arm
152 front connecting surface
153 rear connecting surface
154 guiding arm
155 guiding end face
156 inner guiding surface
157 outer guiding surface
160 rear window guiding profile
161 fastening portion
162 inner guiding leg (guiding leg)
163 outer guiding leg (guiding leg)
164 guiding base
165 accommodating opening
166 sealing lip (sealing portion)
167 sealing surface (contact surface)
168 pressing lip (sealing portion)
169 pressing surface (contact surface)
170 bottom lip (sealing portion)
171 bottom surface (contact surface)
172 sliding protrusion (sealing portion)
173 sliding surface (contact surface)
174 intermediate sealing member (sealing portion)
175 front contact surface (contact surface)
176 rear contact surface (contact surface)
177 exposed surface
190 window assembly
240 window pane
248 guiding section
249 supporting section
250 supporting surface
254 guiding arm
255 guiding end face
256 inner guiding surface
257 outer guiding surface
290 window assembly
340 window pane 341 window section
342 outer window surface
343 inner window surface
345 rear end face
346 closing edge
347 rear end portion
348 guiding section
348a guiding element
349 supporting section
350 supporting surface
351 connecting arm
352 front connecting surface
353 rear connecting surface
354 guiding arm
355 guiding end face
356 inner guiding surface
357 outer guiding surface
358 receiving opening
360 rear window guiding profile
361 fastening portion
362 inner guiding leg (guiding leg)
363 outer guiding leg (guiding leg)
364 guiding base
365 accommodating opening
366 sealing lip (sealing portion)
367 sealing surface (contact surface)
368 pressing lip (sealing portion)
369 pressing surface (contact surface)
370 bottom bulge (sealing portion)
371 bottom surface (contact surface)
372 sliding protrusion (sealing portion)
373 sliding surface (contact surface)
374 intermediate sealing member (sealing portion)
374a cavity
375 front contact surface (contact surface)
376 rear contact surface (contact surface)
377 exposed surface
378 bracket leg
379 bracket opening
380 bracket fastening portion
381 bracket support
385 mounting bracket (trimming portion)
386 fastening limb
387 fastening protrusion
388 reinforcing limb
389 intermediate limb
390 window assembly
460 rear window guiding profile
461 fastening portion
462 inner guiding leg (guiding leg)
463 outer guiding leg (guiding leg)
464 guiding base
465 accommodating opening
466 sealing lip (sealing portion)
467 sealing surface (contact surface)
468 pressing lip (sealing portion)
469 pressing surface (contact surface)
470 bottom dent (sealing portion)
471 bottom surface (contact surface)
472 sliding protrusion (sealing portion)
473 sliding surface (contact surface)
474 intermediate sealing member (sealing portion)
475 front contact surface (contact surface)
476 rear contact surface (contact surface)
477 exposed surface
478 bracket leg
479 bracket opening
480 bracket fastening portion
481 bracket support
482 intermediate sealing lip (sealing portion)
483 intermediate sealing surface (contact surface)
490 window assembly
540 window pane
541 window section
542 outer window surface
543 inner window surface
545 rear end face
547 rear end portion
548 guiding section
549 supporting section
550 supporting surface
551 connecting arm
552 front connecting surface
553 rear connecting surface
554 guiding arm
555 guiding end face
556 inner guiding surface
557 outer guiding surface
560 rear window guiding profile
561 fastening portion
562 inner guiding leg (guiding leg)
563 outer guiding leg (guiding leg)
564 guiding base
565 accommodating opening
566 sealing lip (sealing portion)
567 sealing surface (contact surface)
568 pressing lip (sealing portion)
569 pressing surface (contact surface)
570 bottom cavity
572 sliding protrusion (sealing portion)
573 sliding surface (contact surface)
574 intermediate sealing member (sealing portion)
575 front contact surface (contact surface)
576 rear contact surface (contact surface)
577 exposed surface
578 bracket leg
579 bracket opening
580 bracket fastening portion
581 bracket support
582 intermediate sealing lip (sealing portion)
583 intermediate sealing surface (contact surface)
584 intermediate cavity
585 mounting bracket (trimming portion)
586 fastening limb
588 reinforcing limb
589 intermediate limb
590 window assembly
680 roof sealing profile
681 fastening portion
682 reinforcing member
683 inner sealing member
684 outer sealing member
685 inner buffer cavity
686 outer buffer cavity
687 trimming member
688 trimming portion
689 trimming surface
H horizontal direction
V vertical direction
W waist line
AD accommodating direction
FR front-rear direction
RD receiving direction
LAD lower accommodating direction

The invention claimed is:

1. Window assembly for a window opening of a motor vehicle having a front-rear direction and a vertical direction, comprising:
 a door frame member having an outer surface, a front pillar, and a rear pillar that is spaced apart from the front pillar along the front-rear direction;
 a movable window pane having a guiding section, a window section including an outer window surface and an inner window surface, and a front end face facing to a front and being interposed between the outer window surface and the inner window surface;
 a window guiding profile fastened to the front pillar, and having a sealing portion being configured to seal or support the window pane;
 wherein the window guiding profile includes a first guiding portion configured to guide the window pane only at the inner window surface, or at the inner window surface and the front end face;
 wherein the first guiding portion includes a sealing portion being configured to seal or to support the window pane exclusively at the inner window surface, or a the front end face, or simultaneously at the inner window surface and at the front end face;
 wherein the first guiding portion includes a supporting lip being configured to engage the inner window surface, and wherein the first guiding portion includes an intermediate sealing member being configured to engage the front end face; and
 wherein the window guiding profile further includes a second guiding portion being configured to guide the window pane at the window outer surface and at the window inner surface.

2. Window assembly according to claim 1, further comprising a waist line substantially extending in the front-rear direction, wherein the first guiding portion is disposed above the waist line.

3. Window assembly according to claim 1, wherein the first guiding portion is disposed above the second guiding portion in the vertical direction.

4. Window assembly according to claim 1, wherein the first guiding portion comprises an upper base portion and an upper inner leg portion being connected to the upper base portion, wherein the upper inner leg portion substantially extends parallel to the window pane when viewed in a horizontal cross-section, wherein the sealing portion is arranged at a free end of the upper base portion or free end of the upper inner leg portion.

5. Window assembly according to claim 1, wherein the second guiding portion comprises a lower accommodating opening being configured to accommodate the window pane.

6. Window assembly according to claim 1, wherein the second guiding portion comprises a sealing portion being configured to seal or to support the window pane simultaneously at the outer window surface, at the inner window surface, and at the front end face.

7. Window assembly according to claim 1, further comprising a rear window guiding profile having a fastening portion configured to fasten to the door frame member, and having an accommodating opening configured to accommodate the window pane, wherein the rear window guiding profile is facing the window guiding profile and spaced apart from the window guiding profile along the front-rear direction.

8. Window assembly according to claim 1, further comprising a roof frame member, and a roof sealing profile being fastened to the roof frame member and substantially extending along the front-rear direction, wherein the window pane engages the roof sealing profile, when in a closed position.

9. Window assembly according to claim 1, wherein the outer surface of the door frame member and the window outer surface are arranged so as to be flush.

10. Window assembly according to claim 1, wherein the first guiding portion and the second guiding portion are integrally formed as a single unitary member.

11. A vehicle door comprising a window assembly according to claim 10.

12. Vehicle door for a motor vehicle comprising a window assembly according to claim 1.

13. Motor vehicle comprising a window assembly according to claim 1.

* * * * *